US012731356B2

(12) United States Patent
Cini

(10) Patent No.: US 12,731,356 B2
(45) Date of Patent: Sep. 8, 2026

(54) METHODS AND SYSTEMS FOR RENDERING AND MODIFYING THREE-DIMENSIONAL MODELS FOR INTERIOR DESIGN

(71) Applicant: Little Mama, LTD, Columbus, OH (US)

(72) Inventor: Lisa Cini, Columbus, OH (US)

(73) Assignee: Little Mama, LTD, Columbus, OH (US)

( * ) Notice: Subject to any disclaimer, the term of this patent is extended or adjusted under 35 U.S.C. 154(b) by 125 days.

(21) Appl. No.: 18/789,444

(22) Filed: Jul. 30, 2024

(65) Prior Publication Data

US 2024/0394998 A1 Nov. 28, 2024

Related U.S. Application Data

(63) Continuation-in-part of application No. 17/892,810, filed on Aug. 22, 2022, now Pat. No. 12,086,948, (Continued)

(51) Int. Cl.

*G06T 19/20* (2011.01)
*G06T 7/73* (2017.01)
*G06T 17/00* (2006.01)

(52) U.S. Cl.

CPC ................ *G06T 19/20* (2013.01); *G06T 7/73* (2017.01); *G06T 17/00* (2013.01); (Continued)

(58) Field of Classification Search

CPC .......... G06T 7/73; G06T 19/20; G06T 17/00; G06T 2219/2012; G06T 2200/08; G06T 2219/2024; G06T 2219/2016

(Continued)

(56) References Cited

U.S. PATENT DOCUMENTS 7,277,572 B2 10/2007 MacInnes et al.
7,523,411 B2 4/2009 Carlin
(Continued)

FOREIGN PATENT DOCUMENTS

CN 102663830 9/2012
CN 107944124 4/2018
(Continued)

OTHER PUBLICATIONS

Ramachandran GS, Wright KL, Krishnamachari B. Trinity: a distributed publish/subscribe broker with blockchain-based immutability. arXiv preprint arXiv:1807.03110. Jun. 12, 2018.*

(Continued)

*Primary Examiner* — Phu K Nguyen
(74) *Attorney, Agent, or Firm* — Caldwell LLC

(57) ABSTRACT

A system for rendering and modifying three-dimensional models for interior design includes receiving a current design of an interior space, generating a data structure representing the interior space, wherein generating the data structure further comprises generating a first three-dimensional model of a first portion of the interior space based on the current design, wherein the first three-dimensional model comprises a first feature having a first attribute, receiving at least a command to modify the first attribute, modifying the first three-dimensional model as a function of the at least a command to modify the first attribute and the plurality of degrees of importance, displaying a modified three-dimensional model, and generating a smart contract, wherein the smart contract is associated with the modified three-dimensional model.

20 Claims, 13 Drawing Sheets

Related U.S. Application Data which is a continuation of application No. 16/745,654, filed on Jan. 17, 2020, now Pat. No. 11,461,985.

(60) Provisional application No. 62/798,683, filed on Jan. 30, 2019.

(52) U.S. Cl.
CPC .. *G06T 2200/08* (2013.01); *G06T 2219/2012* (2013.01); *G06T 2219/2016* (2013.01); *G06T 2219/2024* (2013.01)

(58) Field of Classification Search
USPC .......................................................... 345/418
See application file for complete search history.

(56) References Cited

U.S. PATENT DOCUMENTS

| | | | | |
|---|---|---|---|---|
| 8,411,085 | B2 | 4/2013 | Rubin | |
| 9,019,266 | B2 | 4/2015 | Hoguet | |
| 9,817,922 | B2 | 11/2017 | Glunz et al. | |
| 10,002,208 | B2 | 6/2018 | Jovanovic | |
| 10,049,297 | B1 | 8/2018 | Chen | |
| 10,580,207 | B2 | 3/2020 | Pejic | |
| 2010/0161288 | A1 | 6/2010 | Thomas | |
| 2013/0073420 | A1 | 3/2013 | Kumm et al. | |
| 2016/0070826 | A1 | 3/2016 | Yao et al. | |
| 2018/0190033 | A1 | 7/2018 | Barnett et al. | |
| 2022/0327529 | A1* | 10/2022 | Williams | H04L 9/50 |
| 2024/0394998 | A1* | 11/2024 | Cini | G06T 7/73 |
| 2025/0078049 | A1* | 3/2025 | Fakieh | G06Q 30/0645 |
| 2026/0024151 | A1* | 1/2026 | Li | G06Q 50/167 |

FOREIGN PATENT DOCUMENTS

| | | | |
|---|---|---|---|
| JP | 2018092632 | A | 6/2018 |
| WO | 2015171903 | A1 | 11/2015 |

OTHER PUBLICATIONS

Tann WJ, Han XJ, Gupta SS, Ong YS. Towards safer smart contracts: A sequence learning approach to detecting security threats. arXiv preprint arXiv:1811.06632. Nov. 16, 2018.*

Almasoud AS, Eljazzar MM, Hussain F. Toward a self-learned smart contracts. In2018 IEEE 15th International Conference on e-Business Engineering (ICEBE) Oct. 12, 2018 (pp. 269-273). IEEE.*

Zhao W, Du S. Spectral-spatial feature extraction for hyperspectral image classification: A dimension reduction and deep learning approach. IEEE Transactions on Geoscience and Remote Sensing. Apr. 8, 2016;54(8):4544-54.*

Seyedzadeh, S., Rahimian, F.P., Glesk, I. and Roper, M., 2018. Machine learning for estimation of building energy consumption and performance: a review. Visualization in Engineering, 6(1), p. 5.*

Econyl, 5 Principles of Sustainable Interior Design, Econnyl branch, Sep. 2017.

Ogino A. A design support system for indoor design with originality suitable for interior style. In2017 International Conference on Biometrics and Kansei Engineering (ICBAKE) Sep. 15, 2017 (pp. 74-79). IEEE.

Harish VS, Kumar A. A review on modeling and simulation of building energy systems. Renewable and sustainable energy reviews. Apr. 1, 2016;56:1272-92.

Delzendeh E, Wu S, Lee A, Zhou Y. The impact of occupants' behaviours on building energy analysis: A research review. Renewable and sustainable energy reviews. Dec. 1, 2017;80:1061-71.

Autodesk, Jan. 14, 2019 https://webcache.googleusercontent.com/search?q=cache:0N5ITNpEa1EJ:https://www.cadlinecommunity.co.uk/hc/enus/article_attachments/200579112/Revit_BIM_for_Interior_Design.pdf+&cd=10&hl=en&ct=clnk&gl=us.

PCON-Planner, Jan. 14, 2019 https://pcon-planner.com/en/3d-room-planner/.

Chief Architect, Chief Architect Architectural Home Design Software, Jan. 14, 2019 https://www.chiefarchitect.com/interior-design-software/.

Nig Ke Zhu, Using BIM Technology to Optimize the Traditional Interior Design Work Mode, Sep. 2018 https://www.e3s-conferences.org/articles/e3sconf/pdf/2018/13/e3sconf_icemee2018_03026.pdf.

ECDesign, Jan. 14, 2019 https://www.ecdesign.se/ecdesign.html.

* cited by examiner

METHODS AND SYSTEMS FOR RENDERING AND MODIFYING THREE-DIMENSIONAL MODELS FOR INTERIOR DESIGN

CROSS-REFERENCE TO RELATED APPLICATIONS

This application is a continuation-in-part of Non-Provisional application Ser. No. 17/892,810 filed on Aug. 22, 2022, and entitled "METHODS AND SYSTEMS FOR RENDERING AND MODIFYING THREE-DIMENSIONAL MODELS FOR INTERIOR DESIGN", which is a continuation of Non-provisional application Ser. No. 16/745,654 filed on Jan. 17, 2020, now U.S. Pat. No. 11,461,985, issued on Oct. 4, 2022, and entitled "METHODS AND SYSTEMS FOR RENDERING AND MODIFYING THREE-DIMENSIONAL MODELS FOR INTERIOR DESIGN", which claims the benefit of priority of U.S. Provisional Patent Application Ser. No. 62/798,683, filed on Jan. 30, 2019, and entitled "METHODS AND SYSTEMS FOR RENDERING AND MODIFYING THREE-DIMENSIONAL MODELS FOR INTERIOR DESIGN," all of which are incorporated by reference herein in their entirety.

FIELD OF THE INVENTION

The present invention generally relates to the field of computer graphical processing. In particular, the present invention is directed to systems and methods for rendering and modifying three-dimensional models for interior design.

BACKGROUND

Interior design projects require careful planning accounting for many different factors, including not only the appearance of the final design, but the way in which elements needed to affect the design interact, and the practical consequences thereof. Current modeling and graphical programs generally lack the sophistication to account for these factors; such modeling programs are also complicated to use. The result may be poorly executed or inoperative plans that must be continually rewritten, for construction and design projects that rapidly spiral out of control.

SUMMARY OF THE DISCLOSURE

In an aspect, a method of rendering and modifying three-dimensional models for interior design is disclosed. The method comprises receiving, using a modeling device, a current design of an interior space, generating, using the modeling device, a data structure representing the interior space, wherein generating the data structure further comprises generating a first three-dimensional model of a first portion of the interior space based on the current design, wherein the first three-dimensional model comprises a first feature having a first attribute, receiving, using the modeling device, at least a command to modify the first attribute, wherein receiving the at least a command comprises receiving a plurality of user goals comprising an energy consumption goal specifying a level of electrical energy which should be consumed by the first feature, wherein receiving the plurality of user goals further comprises receiving a plurality of degrees of importance corresponding to the plurality of user goals, modifying, using the modeling device, the first three-dimensional model as a function of the at least a command to modify the first attribute and the plurality of degrees of importance, displaying, using the user display device, a modified three-dimensional model, generating a smart contract, wherein the smart contract is associated with the modified three-dimensional model.

In another aspect, a system for rendering and modifying three-dimensional models for interior design is disclosed. The system, in various embodiments, may be used for new builds and/or renovations. The system includes receiving a current design of an interior space, generating a data structure representing the interior space, wherein generating the data structure further comprises generating a first three-dimensional model of a first portion of the interior space based on the current design, wherein the first three-dimensional model comprises a first feature having a first attribute, receiving, using the modeling device, at least a command to modify the first attribute, wherein receiving the at least a command comprises receiving a plurality of user goals comprising an energy consumption goal specifying a level of electrical energy which should be consumed by the first feature, wherein receiving the plurality of user goals further comprises receiving a plurality of degrees of importance corresponding to the plurality of user goals, modifying, using the modeling device, the first three-dimensional model as a function of the at least a command to modify the first attribute and the plurality of degrees of importance, displaying, using the user display device, a modified three-dimensional model, generating a smart contract, wherein the smart contract is associated with the modified three-dimensional model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure provide a three-dimensional modeling system for designs of interior spaces such as rooms and corridors that permits operators to select, arrange, and modify features of the three-dimensional model to reflect potential changes to a corresponding real interior space accurately. Interdependencies may be detected and/or performed using machine learning processes such as k-means clustering algorithms, feature learning, and/or classifiers; processes may be represented and/or archived using a decision tree data structure. In an embodiment, not only may the appearances of introduced or modified features be portrayed accurately in situ, but effects of features on one another or on one or more goals of a project may also be represented accurately; this result may be enabled by introduction of data structures marrying three-dimensional models of spaces and features with data elements representing seen and unseen attributes of such features, as well as rules for interactions of such data elements between data structures that affect in turn rules for rendering a resulting three-dimensional model of a space and its contents.

Figure 1:
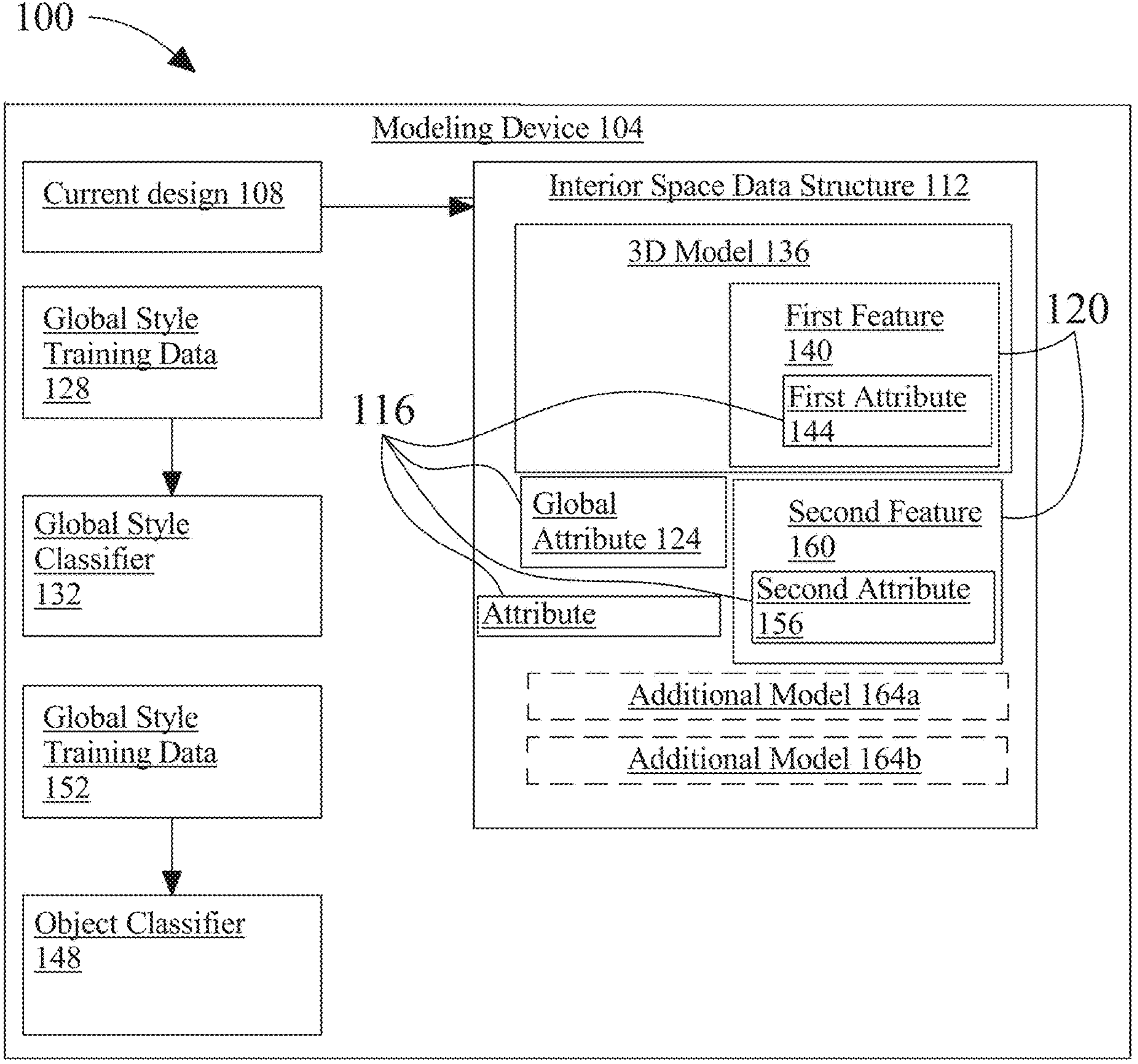
FIG. 1 is a block diagram illustrating an exemplary embodiment of a system as described herein.

Referring now to FIG. 1, an exemplary embodiment of a system 100 for rendering and modifying three-dimensional models for interior design is illustrated. System 100 includes a modeling device 104. Modeling device 104 may include any computing device as described in this disclosure. Modeling device 104 may include, without limitation, a server, a desktop computer, a handheld device, or mobile device such as a smartphone or tablet, and/or a special purpose device incorporating, as a non-limiting example, a biometric reader as described in further detail below. Modeling device 104 may include two or more devices working in concert or in parallel; modeling device 104 may include, for instance, a first server or cluster of servers in a first location and a second server or cluster of servers in a second location. Modeling device 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Modeling device 104 may include one or more computing devices dedicated to data storage, security, distribution of traffic for load balancing, and the like. Modeling device 104 may distribute one or more computing tasks as described below across a plurality of computing devices of modeling device 104, which may operate in parallel, in series, redundantly, or in any other manner used for distribution of tasks or memory between computing devices. Modeling device 104 may be implemented using a "shared nothing" architecture in which data is cached at the worker; in an embodiment, this may enable scalability of system 100 and/or modeling device 104. In an embodiment, modeling device 104 may communicate locally or over a network to one or more remote devices to perform one or more embodiments of processes and/or process steps as disclosed in further detail below.

Still referring to FIG. 1, modeling device 104 may be designed and/or configured to perform any method, method step, or sequence of method steps in any embodiment described in this disclosure, in any order and with any degree of repetition. For instance, modeling device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Modeling device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and continuing to refer to FIG. 1, modeling device 104 is configured to receive a current design 108 of an interior space in a building. A "current design" as used herein, is a model of an interior space, building, one or more portions of building including without limitation a portion containing interior space, or the like. Current design 108 may be provided in any suitable form, including without limitation one or more two-dimensional designs such one or more blueprints, which may include without limitation architectural blueprints. Current design 108 may be provided as a three-dimensional graphical model of interior space, building, and/or a portion of building, such as without limitation a computer-assisted design (CAD) model or the like. Current design 108 may be provided as a building information model (BIM). In an embodiment, modeling device 104 may be configured to convert one form of current design 108 to another.

Still referring to FIG. 1, current design 108 may be received from a remote device via a network connection including any wired, wireless, or other network connection, and according to any suitable communication protocol over such a connection, as described for instance in reference to FIG. 8 below. Current design 108 may be received via local communication by direct connection to another device, a local or portable memory device, or the like. Receiving current design 108 may include converting current design 108 from a first form to a second. For instance, where current design 108 is received as a BIM, current design 108 may be converted to one or more alternative three-dimensional graphical forms such as without limitation one or more CAD models. As a further example, one or more two-dimensional plans of building and/or portions thereof, such as without limitation architectural blueprints or the like, may be received and converted into three-dimensional forms using, for instance, additional data such as ceiling height or the like.

Continuing to refer to FIG. 1, in an embodiment, current design 108 may be generated on modeling device 104 using computer modeling software such as without limitation CAD software. A user may, for instance, enter one or more commands combining geometric elements to generate current design 108. Any combination of the above methods may be used; for instance, a two-dimensional plan may be received from a remote device, converted automatically to a three-dimensional form, and then edited via user commands to produce current design 108. Persons skilled in the art, upon reviewing the entirety of this disclosure, will be aware of various ways in which current design 108 may be received consistently with this disclosure.

Figure 2:
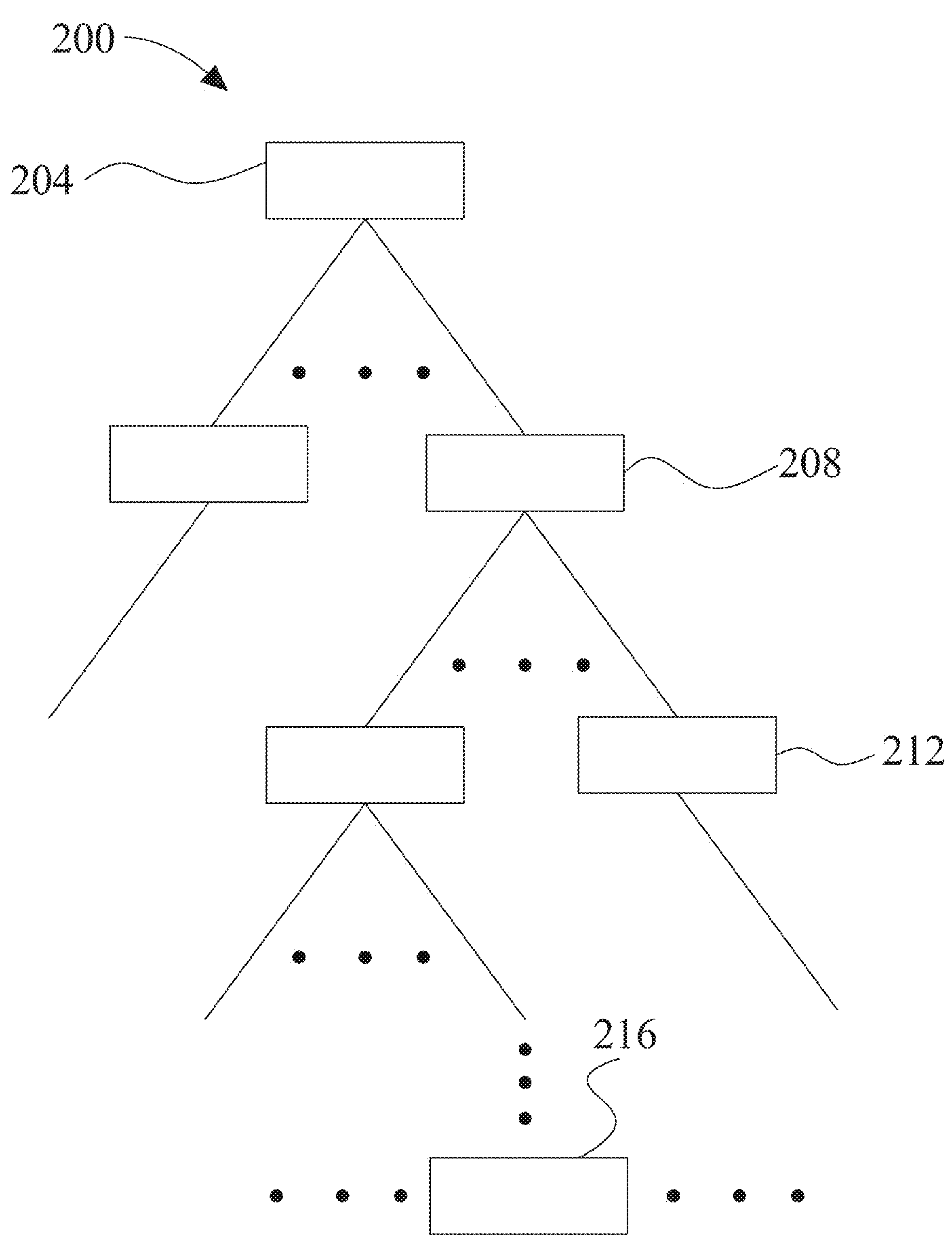
FIG. 2 is a block diagram illustrating an exemplary embodiment of a design decision tree.

Referring now to FIG. 2, generation of current design 108 and/or a part thereof may be performed by receiving data describing current design 108 and/or a in which current design is to be implemented and applying such received data to a design decision tree 200. Design decision tree 200 may include a set of nodes representing a current point in a decision tree traversal process and indicating possible subsequent nodes. Modeling device 104 may commence traversal of decision tree at a first node 204 and/or root node 204 representing an initial selection regarding current design 108 and/or a building and/or space in which current design 108 is implemented; modeling device may determine initial selection based upon any data received as described above and/or entered by a user. Selections to be made, and/or questions to be answered for traversal of decision tree may begin at more general questions toward a root of the decision tree and become more specific as the tree is traversed toward terminal and/or leaf nodes. For instance, and without limitation, a root node 204 may represent a selection of an overall building category and/or use, presenting a selection between residential, industrial, commercial, educational, or other categories; such initial categories may alternatively or additionally be made according to footprint, size height, or other criteria, which may alternatively or additionally be a subsequent node.

Still referring to FIG. 2, selection made at a root node 204 may be a selection of a second node 208, representing a set of decisions to be made based on the selection made at the root node 204. For instance, selection of a commercial building and/or space may lead to a second node 208 representing such a selection, and having paths to a plurality of potential third node 212 that represent categories of commercial buildings and/or spaces. Similarly a second node 208 representing a residential buildings and/or spaces may present potential selections of a third node 212 representing one of various categories of residential space, such as single-family homes, apartment buildings, condominium complexes, senior living facilities, college dorms, or the like. This may in turn lead to subsequent selections of nodes representing additional categories, of which there may be any number of tiers of node selections prior to arrival at a terminal node and/or leaf node. Selections made at each node may be recorded in any suitable data structure, including without limitation a tree, array, vector, and/or one or more database entries. Each selection may specify one or more architectural, structural, engineering, and/or stylistic choices, which may in turn dictate attributes of current design 108, an interior space data structure as described in further detail below, one or more of plurality of features as described in further detail below, or the like. Decision tree may act as a super-structure uniting various interior space data structures as described below, which may represent, for instance, a variety of interior spaces to be modeled and/or built in an overall project. Thus, a user and/or automated process as described in further detail below may use a decision tree to coordinate decisions made between various project levels, permitting both customized and/or personalized choices to be made at each interior space while checking for consistency between such choices; for instance, where a user and/or process modifies a global attribute such as a global style attribute of one interior space as described in further detail below, modeling device 104 may compare this choice to at least a selection in an existing design decision tree 200, determine that the modified global attribute is inconsistent with the at least a selection, and generate a prompt permitting a user to modify the global attribute to be consistent with the at least a selection, to modify the at least a selection to be consistent with the global attribute, and/or to ignore the inconsistency. Modeling device may save a history of selections, which may be useable to reverse decision tree modifications to earlier version and/or to render previous versions by generating interior space data structures and/or three-dimensional models representing previous versions for comparison and/or replacement of current designs; in an embodiment, every element and/or attribute of an interior space data structure and/or current design 108 may be represented by decisions in decision tree, such that decision tree and/or version history thereof may be useable to explore, render, and/or modify any or all previous decisions, giving a user the ability to undo and/or redo past decisions.

As a further illustrative example, and continuing to refer to FIG. 2, if a third node 212 is selected representing a senior living facility, subsequent nodes may include, in any suitable order, a node representing a selection of resident mix, such as proportions of residents having certain age ranges or other demographic attributes, a node representing a selection of a minimum and/or maximum number of residents, a node representing a selection of a minimum number of rooms, a node representing a selection of a number of stories in a building, a node representing a selection of a building type such as 11, 12, or the like, a node representing a site type such as without limitation one or more preloaded and/or stored site types, and or one or more nodes representing selections concerning various internal considerations, such as without limitation selections of types and/or configuration of HVAC, selection of in-house or external laundry, selection of ceiling heights, selection of corridor widths, selection of trash locations and/or processing choices, selection of food service, such as restaurant style versus scheduled mass meals, selection of bathing services and/or facilities, selection of technology such as Internet access, wi-fi, television services, alert services, or the like, selection of medical service types and/or capabilities, and/or selection of systems for provision and/or reception of electric power, including without limitation backup generators. Persons skilled in the art, upon reviewing the entirety of this disclosure, will be aware of various alternative or additional nodes and/or selections represented therein, which may be included in design decision tree 200 to reflect choices generated an/or received regarding various aspects, attributes, and/or data structure representations of interior spaces and/or elements therein as described in further detail below. Each selection in design decision tree 200 may be made and/or modified by user command, comparison of selection criteria represented in a given node to data describing current design 108, an interior space data structure, or any other system 100 element described in this disclosure, and/or any combination thereof.

Referring again to FIG. 1, current design 108 may be generated by loading a stored current design representing a mock plan, where a "mock plan" is a set of data useable in a current design that does not represent an existing current design, and/or previously used design, which may include a design previously used by a current user and/or institution associated with current user, modeling device 104, and/or a client device connected thereto, and/or a design previously used in a location, building, and/or internal space having one or more characteristics in common with a location, building, and/or internal space in which current design 108 is currently implemented and/or is to be implemented. Alternatively or additionally, elements of current design 108 not received from user and/or other sources described herein may be populated by default using mock plan data and/or data from previously used designs and/or design decision tree 200*s*; such data may be replaced by a user and/or any process described herein. In some embodiments, a site plan and/or details or elements of a site plan may be imported to modeling device 104 and used to initialize and/or generate current design 108. A partial or complete version of a current design 108, for instance with modifications as described in this disclosure, may be generated and/or exported for provision to one or more professionals and/or entities responsible for one or more roles in construction, installation, and/or other implementation of a design and/or one or more components thereof; thus, for instance, an electrician may be provided with information describing electrical fixtures, outlets, and/or wiring to be installed and/or modified, without receiving other details not pertinent to such work. Similarly, a construction crew and/or company may receive footprint and other data describing and/or pertaining to construction and/or remodeling of a building to be performed in implementation of a design.

Further referring to FIG. 1, and as a non-limiting, illustrative example, parameters and/or elements of current design 108, design decision tree 200, and/or modifications thereto may include, without limitation, building layouts and/or elements thereof such as type, capacity, exterior backdrops, site plan backdrops (site test fit, restrictions); plans representing room types, sizes, door arrangements, window types, HVAC options, bathroom placement, layout orientation, and/or finishes; hall variations such as corridor width, corridor height, door set-backs versus straight, traffic flow, common area placement, finishes, walls, doors, trim, floors, lighting and ceiling treatments, or the like; common plan elements such as types, height, width, volume, capacity, available space/proportions, finishes, walls, doors, trim, floors, lighting and/or ceiling treatments, or the like; back-of-house area plans including types, height, width, volume, capacity, available space/proportions, finishes, walls, doors, trim, floors, lighting and/or ceiling treatments, or the like; ceiling design plans including ceiling type, trim, heights, soffits, fixtures such as lighting, HVAC, and/or finishes, or the like; and/or miscellaneous options such as lighting, specialty wall, commercial kitchen, treatments, plumbing fixtures, elevators, spa tubs, HVAC types, courtyards, life skills, and/or set pieces of "white" furniture such as for living rooms, resident rooms, dining rooms, and/or activity rooms.

With continued reference to FIG. 1, modeling device 104 is configured to generate a data structure 112 representing the interior space. Data structure 112 may be instantiated using any suitable function, memory addressing, object class, database implementation, or any other implementation that may occur to a person skilled in the art upon reviewing the entirety of this disclosure, which may be used to instantiate any elements and/or capabilities of any embodiment of data structure 112.

Still viewing FIG. 1, data structure 112 includes a plurality of attributes 116. An "attribute" as used in this disclosure is an element of data that describes a physical attribute to be modeled by one or more data structures 112 or models as described herein. An attribute may be created or stored using any data type, data structure 112, and/or object as used in object-oriented programming; a memory location and/or variable for storage of an attribute is referred to in this disclosure as an "attribute variable."

With continued reference to FIG. 1, plurality of attributes 116 may include attributes associated with, and/or included in data representations of, one or more features 120. A "feature" as used in this disclosure is a visible element of an interior space, where "visible" signifies that at least a part of the feature 120 is visible in a three-dimensional model as described in further detail below. A feature 120 may include a geometric or graphical representation of an item incorporated in, installed in, and/or making up a part of interior space; a geometric or graphical representation may include a three-dimensional graphical representation. Item may include any surface, fixture, internal design or architectural element, floor covering, wall covering, item of furniture, door, window, wall, ceiling, electrical outlet or other element of electrical circuitry, items of art or sculpture, and/or any other element of internal design. Geometric or graphical representation may include one or more visual representations of item, including without limitation color, shape, size, texture, material composition, or the like. Geometric or graphical representation may include lighting attributes of item, which may include light and/or shadows cast on item by other objects and/or light sources in internal space, light emitted by item where item is a light fixture, or the like. Features 120 may be stored in a database or data structure 112 within modeling device 104; features 120 may be stored and/or flagged according to one or more categories permitting classification of features 120. One or more features 120 may be classified, for instance, by portions of an interior space where features 120 are placed, such as walls, floor, ceiling, or the like. One or more features 120 may be further classified by type, such as fixtures, outlets, switches, wallpaper, baseboards, molding, furniture, or the like. Classification may include one or more sub-categories; for instance, molding may have a subcategory pertaining to crown molding. Features 120 may be classified to one or more global attributes 124 as described in further detail below. Persons skilled in the art, upon reviewing the entirety of this disclosure, will be aware of various other categories and/or subcategories that may be used to organize one or more features 120.

Continuing to view FIG. 1, each feature 120 may include at least an attribute of plurality of attributes 116, where inclusion of an attribute in a feature 120, as used herein, indicates association of the attribute with the feature 120 in a data object and/or structure storing the feature 120. At least an attribute included in a feature 120 may describe one or more physical or stylistic attributes of a feature 120. For example, and without limitation, at least an attribute may include a style attribute, which may be a global attribute 124 as described in further detail below; for instance, a feature 120 representing a ceiling may have a style attribute indicating that the ceiling is a Venetian-style ceiling, and thus consistent with a global style attribute for a Venetian interior. Alternatively or additionally, style attribute may be a feature 120-specific style attribute, which may be mapped in a data structure 112 as described above to one or more global style attributes; as an example, style attribute for a ceiling may indicate that ceiling is recessed, which may be consistent both with Venetian global style and Victorian internal style. A feature 120 may have several style attributes; for instance, a recessed ceiling may have an additional style attribute indicating a style of carving or other decoration consistent with a Venetian ceiling (and/or mapped to a global style attribute corresponding to Venetian interior in a data structure 112) and not a Victorian ceiling (or not mapping to a Victorian global style attribute), with a result that modeling device 104 may determine that feature 120 does not match a global style attribute of a Victorian interior, but does match a global style attribute of a Venetian interior. Persons skilled in the art will be aware of various ways in which style attributes may be defined, linked to and/or inconsistent with global style attributes as described above.

With continued reference to FIG. 1, at least an attribute may include one or more additional physical attributes including without limitation one or more colors, textures, material composition, shapes, masses, reflective and/or refractive properties, sizes in any dimension including without limitation length, height, width, thickness, and/or depth, or the like. At least an attribute may include a degree of strength, such as without limitation a maximum weight that may be borne by the item represented by the feature 120. At least an attribute may include a requirement such as an electrical wiring requirement of a light fixture, a plumbing requirement of a plumbing fixture, or the like; for instance, a given light fixture may require an electrical connection in a ceiling recess, which may require wiring to be laid to that recess, which may necessitate engaging an electrician. A feature 120 representing a first plumbing or electrical fixture that has been inserted in three-dimensional model and/or interior space data structure 112 containing the three-dimensional model may be inserted where plumbing and/or wiring is represented as laid in the model and/or interior space data structure 112; such wiring or plumbing may also be represented by a feature 120.

Still referring to FIG. 1, plurality of attributes 116 may include one or more global attributes 124, where a "global" attribute signifies, for the purposes of this disclosure, an attribute that has the same value for all elements of data structure 112, including all features 120 and/or attributes, which are associated with and/or that contain the global attribute 124. Plurality of attributes 116 may include a global style attribute. A global style attribute, as used in this disclosure, is an attribute indicating an architectural or interior design style according to which interior space is to be decorated, constructed, arranged, or otherwise instantiated. Global style attribute may be mapped to corresponding color, size, or other attributes of features 120 as described below in one or more data structures 112 which may include without limitation one or more database tables linking one style attribute to another; global style attribute may be linked to a plurality of such attributes. As a non-limiting example, where global style attribute corresponds to a Venetian style of interior, the global style attribute may be linked to recessed ceilings in a Venetian style, such that modeling device 104 matches feature 120 data structures 112 corresponding to such ceilings; modeling device 104 may determine as a result, for instance, that a feature 120 representing a non-recessed ceiling does not match a global style attribute corresponding to a Venetian interior. Persons skilled in the art, upon reviewing the entirety of this disclosure, will be aware of multiple additional examples of global style attributes and matching feature 120 attributes that may be utilized consistently with this disclosure.

Continuing to refer to FIG. 1, attributes, which may include without limitation global attributes, may be selected according to and/or compared to one or more default settings and/or constraints, which may be set in modeling device 104, for instance according to laws and/or best practices such as the Americans with Disabilities Act and/or regulations pursuant thereto, local disability, health and/or safety regulations, industry standards, standards of one or more institutions and/or users involved in and/or overseeing construction and/or design, or the like. Such standards and/or default settings and/or constraints may include, without limitation, a requirement that corridors be a minimum of six feet wide, a requirement that all resident rooms have to have window to the outside, a requirement that corridors cannot be more than 20 feet dead-end without an exit, a requirement that public restrooms must be ADA-compliant, a requirement that ceiling heights must be a minimum of eight feet tall, a requirement that corridor door widths must be a minimum of 36 inches wide, 18 inches clear on pull side and/or 12 inches clear on push side, a requirement that resident room interior doors must be a min of 32 inches wide, a prohibition of pocket doors, a requirement specifying a maximum number and/or proportion of memory care residents in a given unit or set of units, a requirement that plumbing be back to back if possible, to save dollars on construction, or the like. Each and/or every one of these may be set during decision tree process, by user selection of attributes themselves and/or user selection of the requirements, and/or may be preset according to laws, regulations, and/or best practices by an administrator of system 100 or the like; it may be possible to override such default settings, and/or may be impossible, for instance, system 100 may not permit modifications to and/or versions of current design 108 that violate applicable laws and/or regulations.

With continued reference to FIG. 1, plurality of attributes 116 may include an infrastructural attribute. As used in this disclosure, an "infrastructural attribute" includes any attribute as defined herein of an interior space that is necessary to for a feature 120 to be installed in the interior space, aside from the feature 120 itself. For instance, and without limitation, an infrastructural attribute may include a structural attribute, defined as a structural feature 120 of a room necessary to support a weight or shape of a feature 120, including placement of studs or other supports within walls, presence of a particular expanse of space on a wall, ceiling, floor, or the like, a door frame or window frame capable of supporting a door or window of a particular weight, or the like. As another non-limiting example, an infrastructural attribute may include a supply attribute, which may be an attribute providing a supply of liquid, gas, or electricity to a feature 120; for instance, a feature 120 requiring electrical power, such as a light fixture, may be supported by a supply attribute that includes electrical wiring to the feature 120. As a further example, a feature 120 that burns natural gas, such as a furnace, gas fireplace, or the like, may be associated with a supply attribute that includes a gas pipeline or connection to the location of installation of the feature 120. In an additional non-limiting example, a feature 120 that uses water, such as a sink, fountain, or the like, may be associated with a supply attribute that connects the location of the feature 120 to plumbing supply and/or drain lines. A structural attribute may include a climatic attribute, which as used herein may include one or more modifications necessary to support and/or maintain living organisms, artwork, or the like, such as lighting and/or humidity requirements.

Still referring to FIG. 1, plurality of attributes 116 may include a lighting attribute, defined an attribute that affects ambient light in interior space. Lighting attribute may include isolated and/or aggregate effects items represented by features 120 have on lighting in internal space; such changes may include, without limitation, changes representing increased or decreased light output from light fixtures, decreased or increased light admitted by windows, addition of shades, frosted glass, or other elements that occlude or reduce light output or transmittance, increases or decreases in reflectiveness of item, increases or decreases in fluorescence or phosphorescence, increases or decreases in opacity or translucence, or the like. Lighting attribute may include a pattern of light and/or shadow cast on visual representation of features 120 and may be modified to reflect change; visual representation of second feature 160 may be changed accordingly as well. Lighting attributes such as light and shadow patterns in three-dimensional model may be tracked and represented as an attribute of three-dimensional model and/or of interior space data structure 112 containing the three-dimensional model.

Figure 3:
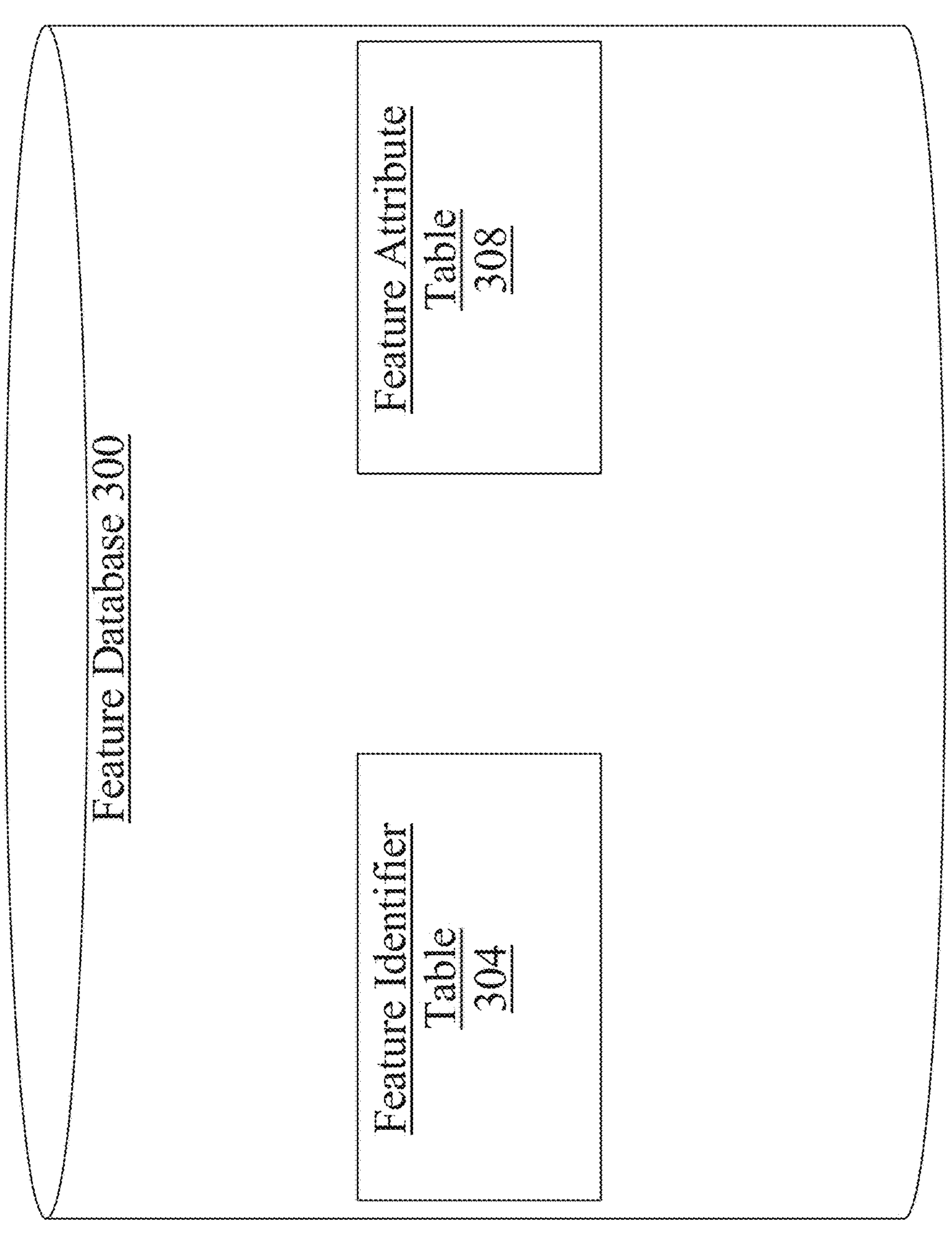
FIG. 3 is a block diagram illustrating an exemplary embodiment of a feature database.

Referring now to FIG. 3, an exemplary embodiment of a feature database 300 is illustrated. Feature database 300 may include any data structure 112 for ordered storage and retrieval of data, which may be implemented as a hardware or software module. Feature database 300 may be implemented, without limitation, as a relational database, a key-value retrieval datastore such as a NOSQL database, or any other format or structure for use as a datastore that a person skilled in the art would recognize as suitable upon review of the entirety of this disclosure. Feature database 300 may include a plurality of data entries and/or records corresponding to user tests as described above. Data entries in a feature database 300 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a feature database 300 may reflect categories, cohorts, and/or populations of data consistently with this disclosure.

Still referring to FIG. 3, feature database 300 may include one or more tables from which data records may be retrieved with linking data. As a non-limiting example, one or more tables may include a feature identifier table 304. Feature identifier table 304 may list unique identifiers of features 120, where "unique" may signify statistically unique, as with globally unique identifiers (GUID) and/or universally unique identifiers (UUID), and/or unique within system 100, as determined for instance by preventing creation of duplicate identifiers by verifying that a newly generated identifier is not already in use; this may be accomplished without limitation, by using a newly generated prospective identifier to query feature identifier table 304. Feature identifier table 304 may have additional columns associating a feature 120 with one or more data concerning the feature 120, such as without limitation a feature 120 description usable to describe a feature 120 verbally to a user, a feature 120 type, suitable for retrieval and/or comparison of multiple features 120 having aspects in common, and/or one or more feature 120 images, which may be used for visual selection of features 120 by users and/or display thereof in three-dimensional models as described in further detail below. Table 1, shown below, is provided for illustrative purposes only to indicate exemplary records, and/or elements thereof, which may be stored in feature identifier table 304 in an embodiment.

TABLE 1

| Feature Identifier | Feature Description | Feature Type |
|---|---|---|
| 905281715 | Crystal chandelier | Light Fixture |
| 629648411 | Recessed Circular Florescent | Light Fixture |
| 215455165 | Persian Silk Rug | Floor covering |
| 106546549 | 3-inch shag white carpet | Floor covering |

Continuing to refer to FIG. 3, and as a non-limiting example, feature database 300 may include a feature attribute table 308. Feature attribute table 308 may include a column listing feature identifiers. Feature attribute table 308 may include a column listing identifiers of attributes that a feature 120 associated with a particular feature identifier possesses or is associated with, for instance as described above; each of such identifiers of attributes, which may be described as "attribute identifiers" for the purposes of this disclosure, may be unique, where uniqueness may have the meaning described above regarding feature identifiers. Feature attribute table 308 may, as a non-limiting example, include multiple rows for a given feature identifier, each row listing a different attribute identifier in an attribute identifier column; where a new attribute is associated with a feature 120 according to any method as described herein, a new row listing the feature identifier of the feature 120 and the attribute identifier may be added to feature attribute table 308. Feature attribute table 308 may have additional columns for storing data that may be written to and/or retrieved from feature attribute table 308 and/or feature database 300. Table 2, shown below, is provided for illustrative purposes only to indicate exemplary records, and/or elements thereof, which may be stored in feature attribute table 308 in an embodiment.

TABLE 2

| Feature Identifier | Attribute identifier |
|---|---|
| 905281715 | 55516116000 |
| 905281715 | 81818181118 |
| 905281715 | 98941153517 |

Figure 4:
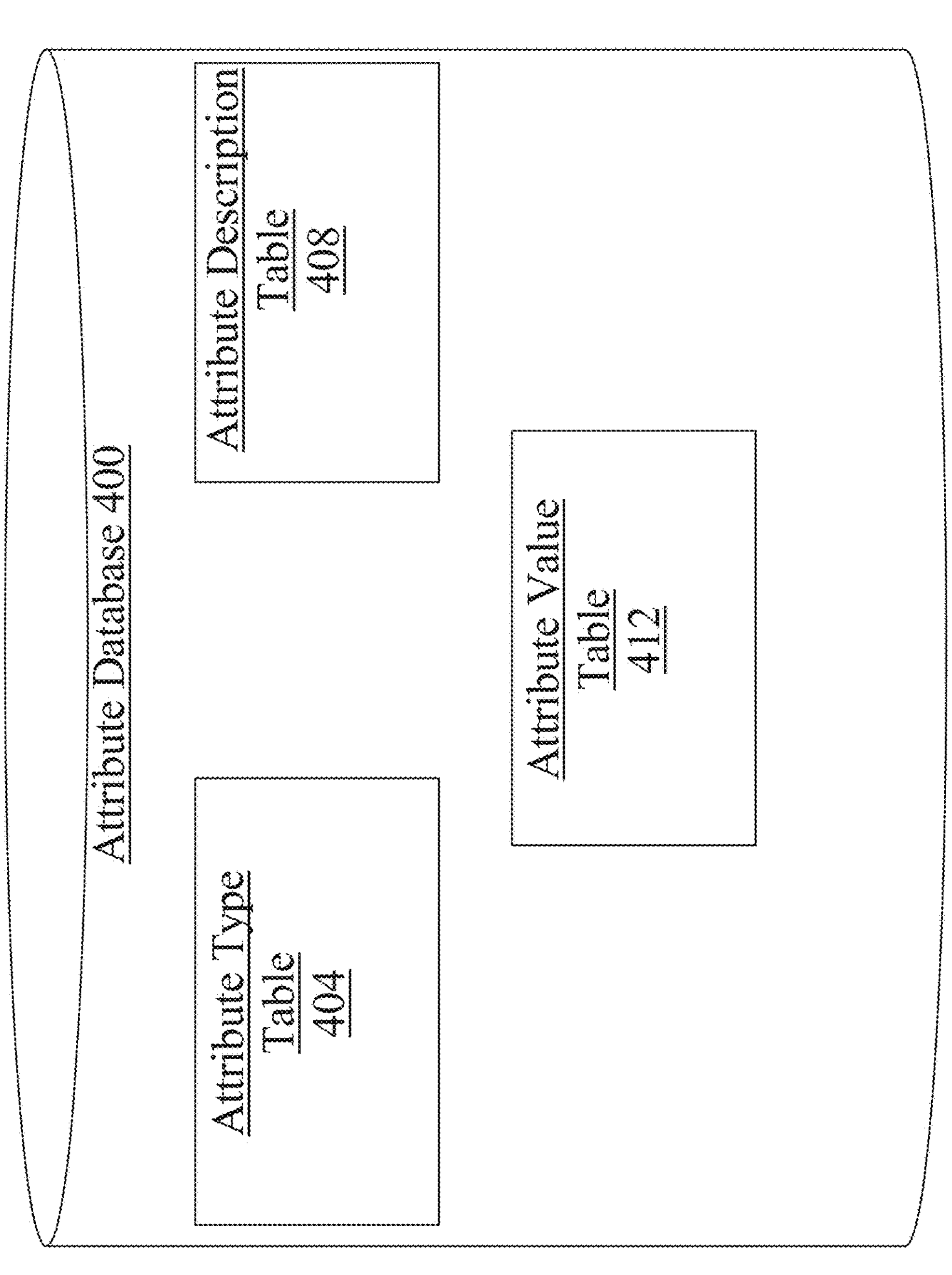
FIG. 4 is a block diagram illustrating an exemplary embodiment of an attribute database.

Referring now to FIG. 4, an exemplary embodiment of an attribute database 400 is illustrated. Attribute database 400 may have any form suitable for use as feature database 300 as described above. Attribute database 400 may include one or more tables such as, without limitation, an attribute type table 404, which may associate attribute identifiers with categories of attributes such as color, material, weight, function, shape, or the like, for instance as shown in Table 3, below.

TABLE 3

| Attribute identifier | Attribute Type |
|---|---|
| 55516116000 | Color |

Attribute database 400 may include, without limitation, an attribute description table 408, which may associate attribute identifiers with descriptions of attributes suitable for describing attributes to users. Attribute description table 408 may include one or more additional columns containing data as consistent with and/or in support of embodiments described below. An exemplary illustration of attribute description table 408 is shown for example in Table 4, below.

TABLE 4

| Attribute identifier | Attribute Description |
|---|---|
| 55516116000 | Color of a metal object such as a light fixture |

Attribute database 400 may include, without limitation, an attribute value table 412, which may associate attribute identifiers with values of attributes; for instance, a color attribute may have a red-green-blue color value and/or a string associated with a color, while a weight attribute may have an amount of weight or mass in pounds, kilograms or the like, a shape attribute may have a geometric value (e.g., rectangular, elliptical), and/or stylistic shape value (e.g., Ogee). Attribute value table 412 may include one or more additional columns containing data as consistent with and/or in support of embodiments described below. An exemplary illustration of attribute description table 408 is shown for example in Table 5, below.

TABLE 5

| Attribute identifier | Attribute Value |
|---|---|
| 55516116000 | Silver |

Figure 5:
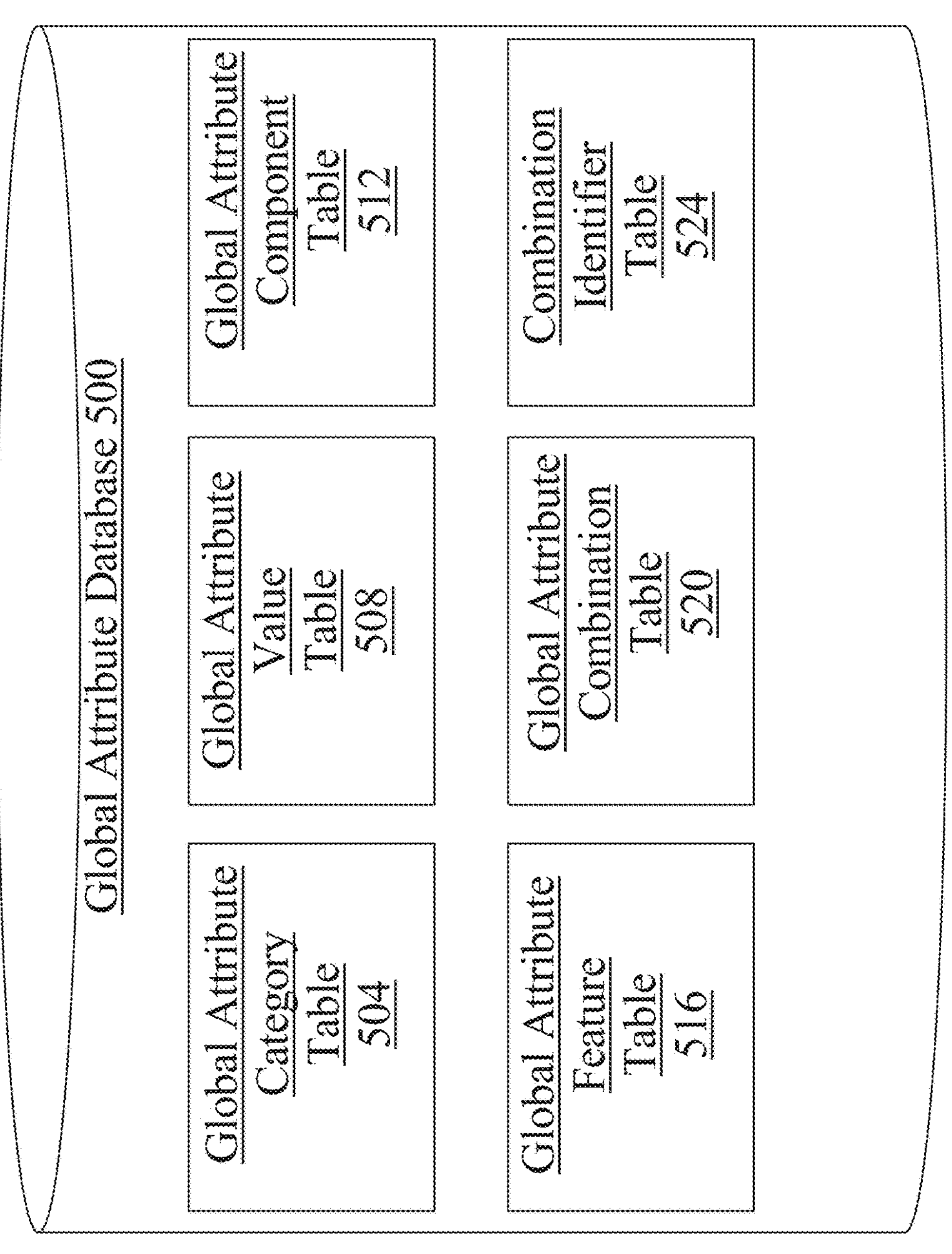
FIG. 5 is a block diagram illustrating an exemplary embodiment of a global attribute database.

Referring now to FIG. 5, an exemplary embodiment of a global attribute database 500 is illustrated. Global attribute database 500 may have any form suitable for use as feature database 300 as described above. Global attribute database 500 may include one or more tables such as, without limitation, a global attribute category table 504, which may associate attribute identifiers of global attributes 124 with categories of global attributes 124 such as a global style attribute, which may be denoted as having an attribute of "style," as shown in Table 6, below. Global attribute category table 504 may include one or more additional columns containing data as consistent with and/or in support of embodiments described below.

TABLE 6

| Global attribute identifier | Global attribute type |
|---|---|
| 71322148510 | Style |

Global attribute database 500 may include, without limitation, a global attribute value table 508, which may associate attribute identifiers of global attributes 124 with values, which may be labels containing any textual data that denote particular global attributes 124, such as "Venetian" as shown for example in Table 7, below. Global attribute category table 504 may include one or more additional columns containing data as consistent with and/or in support of embodiments described below.

TABLE 7

| Global attribute identifier | Global attribute value |
|---|---|
| 71322148510 | Venetian |

Global attribute database 500 may include, without limitation, a global attribute component table 512, which may associate attribute identifiers of global attributes 124 with other attributes that are associated with and/or classified to the global attribute 124, such as particular colors, room shapes, room proportions, or the like, as shown for example in Table 8, below. Global attribute component table 512 may include one or more additional columns containing data as consistent with and/or in support of embodiments described below.

TABLE 8

| Global attribute identifier | Attribute Identifier |
|---|---|
| 71322148510 | 55150611531 |
| 71322148510 | 81216813251 |
| 71322148510 | 20111715561 |
| 71322148510 | 64551355155 |

Global attribute database 500 may include, without limitation, a global attribute feature table 516, which may associate attribute identifiers of global attributes 124 with features 120 that are associated with and/or classified to the global attribute 124, such as particular ceiling types, fixtures, floor or wall coverings, or the like, as shown for example in Table 9, below. Global attribute feature table 516 may include one or more additional columns containing data as consistent with and/or in support of embodiments described below.

TABLE 9

| Global attribute identifier | Feature Identifier |
|---|---|
| 71322148510 | 905281715 |
| 71322148510 | 100544811 |
| 71322148510 | 741811655 |
| 71322148510 | 315111800 |

Global attribute database 500 may include, without limitation, a global attribute combination table 520, which may associate attribute identifiers of global attributes 124 with identifiers of combinations of features 120 and/or attributes that are associated with and/or classified to the global attribute 124, as shown for example in Table 10, below. Global attribute combination table 520 may include one or more additional columns containing data as consistent with and/or in support of embodiments described below.

TABLE 10

| Global attribute identifier | Combination Identifier |
|---|---|
| 71322148510 | 9005115 |
| 71322148510 | 3362811 |
| 71322148510 | 1105549 |
| 71322148510 | 7767677 |

Global attribute database 500 may include, without limitation, a combination identifier table 524, which may associate attribute identifiers of combinations of features 120 and/or attributes identified in classifications, or the like as described below with the features 120 and/or attributes identified as members of such combinations, as shown for example in Table 9, below. Combination identifier table 524 may include one or more additional columns containing data as consistent with and/or in support of embodiments described below.

TABLE 11

| Combination Identifier | Feature Identifier | Attribute Identifier |
|---|---|---|
| 9005115 | 905281715 | 55150611531 |
| 3362811 | 100544811 | 81216813251 |
| 1105549 | 741811655 | 20111715561 |
| 7767677 | 315111800 | 64551355155 |

Referring again to FIG. 1, modeling device 104 may be configured to generate a global style attribute. In an embodiment, a user may select global style attribute, for instance by specifying that the user wishes the interior space in question to be rendered in a particular style. Global style attribute may alternatively or additionally be chosen as part of design decision tree 200 as described above. For instance, and without limitation, a graphical user interface may be provided to a user client device, which may be enabled to provide one or more options to user and/or receive one or more inputs from user as described in this disclosure; graphical user interface may be used to provide user with a list of global style attributes from which the user may select a global style attribute desired by the user, in which a user may perform keyword searches for particular global style attributes, or the like. Persons skilled in the art, upon reviewing the entirety of this disclosure, will be aware of various ways in which a user may be enabled to select and/or specify a global style attribute consistently with this disclosure, as well as the various input and output options that a graphical user interface may provide a user to do so.

Alternatively or additionally, and still referring to FIG. 1, modeling device 104 may be configured to generate a global style attribute automatically using one or more data provided to modeling device 104 concerning internal space, including without limitation one or more user inputs, current design 108, or the like, as set forth in further detail below. As a non-limiting example, one or more data provided to modeling device 104 may include one or more features 120 and/or sets of features 120 a user selects or has selected for display in a three-dimensional model and/or inclusion in data structure 112, a user selects or has selected for display in a three-dimensional model and/or inclusion in data structure 112, one or more features 120 and/or attributes described in current design 108, one or more features 120 or attributes of a distinct data structure 112 that a user identifies, for instance as generated in a previous iteration of an embodiment of a method as described in this disclosure, one or more features 120 and/or attributes identified in a photograph a user provides as described in more detail below, or the like. In an embodiment, one or more features 120 and/or sets of features 120, one or more attributes and/or sets of attributes, and/or any combination thereof, may be associated with a global style, for instance in global attribute component table 512 and/or global attribute feature table 516. Global attribute database 500 may, for instance, have additional tables and/or columns identifying combinations of features 120 and/or attributes that are associated with a particular global style; such combinations of features 120 and/or attributes may be identified in global attribute combination table 520, using combination identifier table 524, as described above. A feature 120, attribute, and/or any combination thereof as selected by and/or entered by user may be used to retrieve a matching global style attribute from global attribute 124 table. Global attribute 124 table may be populated, without limitation, by entries provided by users, who may be expert users selected by an administrator and/or proprietor of system 100; alternatively or additionally, global attribute 124 table may be populated by classification processes as described in further detail below.

With continued reference to FIG. 1, modeling device 104 may be configured to associate one or more classification algorithms. A classification algorithm, as used herein is a form of machine learning process. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Training data, as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and continuing to refer to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by modeling device 104 may correlate any input data as described in this disclosure to any output data as described in this disclosure. As a non-limiting illustrative example, global style training data 128 may include sets of data correlating features 120, attributes, and global styles as identified in previous interior spaces, including without limitation spaces, features 120, and attributes identified by users such as expert users or the like, and/or spaces having identified or user-entered global styles for which image object classification has been performed as described in further detail below.

Still referring to FIG. 1, modeling device 104 may perform one or more classification algorithms, defined as processes whereby a computing device derives, from training data, a model known as a "classifier" for sorting inputs into categories or bins of data; modeling device 104 may, for instance, produce a global style classifier 132 that classifies features 120, attributes, and/or combinations of features 120 and/or attributes to one or more global styles most probably associated with such features 120, attributes, and/or combinations of features 120 and/or attributes. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

As a non-limiting and illustrative example, and still referring to FIG. 1, modeling device 104 may be configured to generate global style classifier 132 using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance global style training data 128 as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of features 120, attributes, and/or combinations thereof to global style attributes, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis May include hierarchical clustering whereby observations or unclassified cluster data entries that belong to a child cluster also belong to a parent cluster.

With continued reference to FIG. 1, modeling device 104 may generate a k-means clustering algorithm receiving unclassified features 120, attributes, and/or combinations thereof as inputs and outputs a definite number of classified data entry cluster wherein the data entry clusters each contain cluster data entries associated with global style attributes and/or attribute identifiers thereof. K-means clustering algorithm may select a specific number of groups or clusters to output, identified by a variable "k." Generating a k-means clustering algorithm includes assigning inputs containing unclassified data to a "k-group" or "k-cluster" based on feature 120 similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of values which are utilized to classify data entry clusters containing cluster data entries. K-means clustering algorithm may act to classify a given global style attribute to one or more features 120, attributes, and/or combinations thereof, enabling modeling device 104 to identify features 120, attributes, and/or combinations thereof correlated with global style attributes.

Still referring to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $$\arg\min_{ci \ni C} dist(ci, x)^2,$$

where argmin includes argument of the minimum, ci includes a collection of centroids in a set C, and dist includes standard Euclidean distance. K-means clustering algorithm may then recompute centroids by taking mean of all cluster data entries assigned to a centroid's cluster. This may be calculated based on $$ci = 1/|Si|\sum xi \ni Si^{xi}.$$

K-means clustering algorithm may continue to repeat these calculations until a stopping criterion has been satisfied such as when cluster data entries do not change clusters, the sum of the distances have been minimized, and/or some maximum number of iterations has been reached.

Continuing to refer to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected set of features 120, attributes, and/or combinations thereof. Degree of similarity index value may indicate how close a particular combination of features 120, attributes, and/or combinations thereof to global style attributes is to being classified by k-means algorithm to a particular cluster. K-means clustering algorithm may evaluate the distances of features 120, attributes, and/or combinations thereof to global style attributes to the k-number of clusters output by k-means clustering algorithm. Short distances between features 120, attributes, and/or combinations thereof to global style attributes and a cluster may indicate a higher degree of similarity between a feature 120, attribute, and/or combination thereof to global style attributes and a particular cluster. Longer distances between features 120, attributes, and/or combinations thereof to global style attributes and a cluster may indicate a lower degree of similarity between the features 120, attributes, and/or combinations thereof to global style attributes and a particular cluster.

With continued reference to FIG. 1, k-means clustering algorithm may select a classified data entry cluster as a function of the degree of similarity index value. In an embodiment, k-means clustering algorithm may select a classified data entry cluster with the smallest degree of similarity index value indicating a high degree of similarity between a feature 120, attribute, and/or combination thereof and a particular data entry cluster representing a global style attribute. Alternatively or additionally k-means clustering algorithm may select a plurality of clusters having low degree of similarity index values to features 120, attributes, and/or combinations thereof, indicative of greater degrees of similarity. Degree of similarity index values may be compared to a threshold number indicating a minimal degree of relatedness suitable for inclusion of a feature 120, attribute, and/or combination thereof in a cluster, where degree of similarity indices falling under the threshold number may be included as indicative of high degrees of relatedness. The above-described illustration of learning using k-means clustering is included for illustrative purposes only and should not be construed as limiting potential implementation of learning algorithms; persons skilled in the art, upon reviewing the entirety of this disclosure, will be aware of various additional or alternative learning approaches that may be used consistently with this disclosure.

Still referring to FIG. 1, modeling device 104 may be configured to generate global style classifier 132 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P(B/A) P(A)÷P(B), where P (A/B) is the probability of hypothesis A given data B also known as posterior probability; P(B/A) is the probability of data B given that the hypothesis A was true; P (A) is the probability of hypothesis A being true regardless of data also known as prior probability of A; and P(B) is the probability of the data regardless of the hypothesis. A naïve Bayes algorithm may be generated by first transforming global style training data 128 into a frequency table. Modeling device 104 may then calculate a likelihood table by calculating probabilities of different data entries and classification labels. Modeling device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

In an embodiment, and with continued reference to FIG. 1, modeling device 104 may identify a global style attribute for interior space using global style classifier 132 directly, and/or by querying global style database to find one or more data entries linking feature 120, attribute, and/or combination thereof to global style attributes. Modeling device 104 may populate global style database with an entry for each classification output having a probability of association above a threshold value; alternatively, where global style classifier 132 is configured to output a single classification, modeling device 104 may enter an entry in global style database associating a feature 120, attribute, and/or combination thereof with a single global style. The above processes may be combined; for instance, an initial and/or default global style may be identified using a database entry, and one or more suggested alternatives or options may be provided using global style classifier 132.

Still referring to FIG. 1, modeling device 104 may use global style classifier 132 and/or one or more data entries associated therewith to retrieve one or more features 120 and/or attributes associated with a current global style attribute of data structure 112. One or more features 120 and/or attributes may be populated in a graphical user interface as options for a user to select, for instance by providing a separate window and/or listing of "in style" features 120 and/or attributes, from which user may select a desired feature 120 and/or attribute, by listing "in style" features 120 and/or attributes first in an ordered listing of features 120 and/or attributes, or the like. Features 120 and/or attributes that are not associated with global style attribute may be visible and/or accessible to user as well. Graphical user interface may, for instance, display only features 120 and/or attributes associated with global style attribute when a setting visible to user so specifies, and user may be able to change the setting so that features 120 and/or attributes not associated with global style attribute may display. Where a given feature 120 and/or attribute is classified to global style attribute as part of a combination of features 120 and/or attributes, modeling device 104 may populate such features 120 and/or attributes using the combination, and/or offer a user the option to populate such features 120 and/or attributes using the combination; modeling device 104 may, for instance, automatedly generate furnishings, interior design, decorations, fixtures, wall coverings, floor coverings, doors, windows, and/or ceiling styles automatically, and display views and/or design of interior space to user according to any process described in this disclosure. Such an automatedly generated interior design may be presented to user as an option for interior design, potentially saving the user effort in selecting features 120 for the interior design; user may modify the automatedly selected design to customize a final design according to user's judgement and/or taste.

Still referring to FIG. 1, it should be noted that the above-described processes for generating global style attribute are described with respect to global style attribute for exemplary purposes only. Such automatic generation processes may alternatively or additionally be used to generate other global attributes 124 as described in this disclosure.

With continued reference to FIG. 1, modeling device 104 may be configured to generate data structure 112 by generating a first three-dimensional model 136 of a first portion of the interior space based on the current design 108. First three-dimensional model 136 may include or be included in any model suitable for use as a three-dimensional graphical model of current design 108, including without limitation a CAD model. First three-dimensional model 136 may depict to a user such as a designer or other person operating or interacting with system 100 a view of interior space, which may correspond to a view that a user may be able to see in an ordinary field of vision viewing a room from a particular vantage point. View may include, as a non-limiting example, a perspective view. First three-dimensional model 136 may be included in or associated with an interior space data structure 112 containing information concerning interior space that may be used to generate any first three-dimensional model 136, including additional model 164*a-b* as described below, variables two or more such models have in common, or the like.

Still referring to FIG. 1, generation of first three-dimensional model 136 may include receiving a user selection of a representation of interior space in current design 108; for instance, representation of interior space may be a representation of a corridor, a room, a set of rooms and corridors, or the like. In an embodiment, selection of representation of interior space may include a selection a scope of work to be performed in interior space, and thus selection of portions of a building to be modeled using first three-dimensional model 136. In an embodiment, where reception of current design 108 includes reception of a two-dimensional representation such as one or more blueprints, a first three-dimensional model 136 of interior space may be generated from one or more two-dimensional representations of selected portions of current design 108; this may be performed according to any process describe above for conversion of two-dimensional representations to three-dimensional representations.

Still referring to FIG. 1, generation of first three-dimensional model 136 may include population of first three-dimensional model 136 with one or more features 120 representing a current or starting state of first three-dimensional model 136. One or more features 120 may be inserted by a user, who may, without limitation, drag and drop such features 120 from one or more menus or the like presenting features 120 onto first three-dimensional model 136, select features 120 on such menus and press a button to activate their placement in first three-dimensional model 136, or the like; placement in first three-dimensional model 136 may be further selected and/or refined by user by means of a cursor controlled by a mouse, touch-screen, or similar manual entry device. Selection of features 120 may be performed in conjunction with retrieval and/or display of such features 120 using global style attribute as described above. Alternatively or additionally, current design 108 may be received with one or more geometric or other representations of items in interior space; for instance, where current design 108 is received in BIM form, fixtures, elements of furniture, decorative elements, and the like may already be represented using one or more data structures 112 and/or geometric representations. Where current design 108 includes representations of items in interior space, modeling device 104 may convert such representations into features 120; for instance, features 120 stored in one or more data structures 112 as described above may be matched by geometry to one or more geometric representations, matched by catalog identity or commonly agreed-upon identifiers of features 120, or the like. Matching features 120 may replace representations of items in first three-dimensional model 136 of interior space.

Continuing to refer to FIG. 1, in an embodiment in which methods and/or one or more steps of methods as described in this disclosure are performed iteratively, first three-dimensional model 136 of a portion of interior space may be generated based wholly or in part on a previously generated first three-dimensional model 136 of a portion of interior space; for instance, where the previously generated model represents or provides a view of one end of a corridor or side of a room, currently generated model may represent a second end of the corridor or side of the room. Modeling device 104 may automatedly generate features 120 in current model based on selections made in an earlier view, for instance using global attributes 124 such as global style attribute to populate features 120 that are associated, along with previously selected features 120 and/or attributes, with a combination of features 120 and/or attributes associated with that global style, for instance as described above. As an additional non-limiting example, where a user selected crown molding, floor coverings, wall coverings, or the like, which are capable of extension into other portions of interior space, current view may be populated with those features 120 as well. As a further example, a global style attribute may be applied to current model based on a global style attribute selected, generated, or otherwise derived in a previous iteration of methods and/or one or more method steps as described in this disclosure. One or more additional models 164*a-b* may be subsequently generated in a further iteration of a method as described herein and/or one or more steps thereof.

Still referring to FIG. 1, data structure 112 may include and/or be populated using one or more prefabricated design modules. A prefabricated design module, as used herein, is a collection of features and/or attributes stored in memory of modeling device 104 that are mutually compatible, which may be inserted into data structure 112 and/or used as data structure 112 to permit rapid assembly of an overall design. For instance, for each data structure 112 in an overall project, design decision tree 200, current design 108, and/or other data describing a current project may be matched to one or more prefabricated design modules, which may be used to populate data structure 112 and/or a collection of such data structures, to create a default and/or suggested design. This may be performed automatedly and/or via use selections; user selections of prefabricated design modules may, for instance, be performed by specifying one or more parameters, attributes, features, or the like such as cost, global style, or other considerations, which may be used by modeling device 104 to generate an overall design and/or to provide prefabricated design modules for a user to select from to generate overall design. Pre-fabricated models may include interoperable interactive parameters to support the client assembly to "fit" prefabricated models to each other; for instance, rules may be stored in or associated with each pre-fabricated design module indicating one or more such modules that. System may store a value system within the three levels of cost/quality options, such as "good, better, and best." Each prefabricated design module, feature, and/or attribute option, whether automatedly selected and/or presented to and/or selected by user, may include a quality and/or cost designation with such a three or more level system providing a user with a way to compare options and make qualitative and/or budgetary decisions quickly on a per-unit, per-attribute, per-data structure, per-space, and/or per-project basis. A data structure 112, interior design, and/or project created by assembling such prefabricated modules may be modified by user selections and/or automated processes as described in this disclosure. As a non-limiting example, prefabricated modules may be assembled to represent a current design 108 and/or mock plan as described above, and then modified as specified by user entries and/or automated processes. In an embodiment, modifications may cause modeling device to identify alternative prefabricated modules that may match modifications, which may be automatically substituted for existing modules and/or presented to user with tiered quality and/or pricing information, such that user may be presented with an option to follow prefabricated designs with predictable costs and/or to customize according to the user's design vision.

Further referring to FIG. 1, prefabricated design module, data structure 112, and/or three-dimensional models therein may be stored in and/or represented by CAD blocks or other modules built out to form correct spaced plans quickly with costs associated to them for interior finishes and/or other attributes. Prefabricated design modules and/or modules as modified may exist and/or be generated to represent, without limitation, resident room types including studio, semi, 1 bedroom, 2 bedroom, or other types of rooms; circulation, including without limitation corridors, stairs, vestibule, sidewalk, parking, porte cochere, or the like; common areas such as without limitation dining, country kitchen, private dining, spa, salon, fitness, activity such as art and/or games, family/TV room, resource library, sunroom, front porch, courtyard, telemedicine/VoIP and/or video chat room, lobby, life skills, outpatient therapy, community space, or the like; and/or offices such as executive director, closing room, business manager, marketing, activities director, maintenance director, receptionist, food service director, social worker, director of nursing, or the like; back of house spaces such as medication room/charting, laundry, commercial kitchen, receiving, storage, janitors' closets/housekeeping, IT rooms, electrical rooms, and/or mechanical rooms. These examples are not intended to be exhaustive. Persons skilled in the art, upon reviewing the entirety of this disclosure, will be aware of many alternative or additional prefabricated modules and/or modules that may be generated, stored, modified, and/or otherwise used and/or incorporated in embodiments described in this disclosure.

With continued reference to FIG. 1, first three-dimensional model 136 includes a first feature 140 having a first attribute 144 of the plurality of attributes 116. As used herein, inclusion of a feature 120 in a three-dimensional model signifies display of a visible portion of that feature 120 in the three-dimensional model; for instance, where the feature 120 is a fixture, a visible surface of the fixture as seen in a view represented in first three-dimensional model 136, where the feature 120 is a floor covering wall covering, or the like, a portion of the floor or wall that is visible in first three-dimensional view may be displayed in first three-dimensional view, or the like. In general, for a feature 120 that may extend out of first three-dimensional view, such as a feature 120 that runs along a wall, ceiling, or floor far enough for a portion of the feature 120 not to be visible in first three-dimensional view, a portion of the feature 120 that is visible in the first three-dimensional view will display.

Still referring to FIG. 1, generating the first three-dimensional model 136 may include receiving a user selection of first feature 140. User may select first feature 140 in graphical user interface by entering a description of a category and/or type of feature 120 that user wishes to select; modeling device 104 may receive a user entry of a type of feature 120 and query feature database 300 to retrieve one or more features 120 matching user-entered feature 120 type. Alternatively or additionally, one or more features 120 may be automatically displayed to user either in first three-dimensional view and/or in a selection window; user may enter an instruction and/or action selecting a feature 120 of the one or more features 120. As a further non-limiting example, graphical user interface may display a plurality of windows and/or lists of features 120, where each window corresponds to a distinct feature 120 category, permitting user to select a feature 120 from any such window. User selection of first feature 140 may include any user action for modification of first feature 140 as described below. Persons skilled in the art, upon reviewing the entirety of this disclosure, will be aware of various ways in which modeling device 104 may receive a user selection of a first feature 140 and/or provide first feature 140 in first three-dimensional model 136 as a function of a user selection.

In an embodiment, and still referring to FIG. 1, generating the first three-dimensional model 136 may include receiving a photograph of the first portion of the interior space, detecting objects within the photograph, classifying the objects to features 120, and generating the three first three-dimensional model 136 using the features 120. Objects to be classified may include, without limitation, one or more geometric forms present in photograph. One or more geometric forms may be identified using any suitable method for identifying one or more elements of geometry in a digital photograph and/or image, including without limitation edge detection, detection of contrasting colors and/or intensities, or the like. Objects detected may include, without limitation, geometrical forms of a shape of a room, walls, ceiling, floor, fixture, or any other item that may be visible in a photograph of an internal space; such geometric forms may, as a non-limiting example, be projections onto two dimensions of three-dimensional shapes and/or orientations of objects. For instance, a geometric form representing a rectangular section of ceiling, floor, and/or wall may have a substantially trapezoidal form reflecting perspective foreshortening in a photograph.

With continued reference to FIG. 1, modeling device 104 may be configured to classify objects identified in photograph to features 120 using an object classifier 148. Object classifier 148 may include any classifier described above; object classifier 148 may generate an output classifying a geometric form in a photograph to a feature 120 according to any classification algorithm as described above. In an embodiment, modeling device 104 may train object classifier 148 using an object classification training set 152, which may, as a non-limiting example, include geometric forms extracted from photographs and identifications of one or more features 120 associated therewith. Object classifier 148 training set may, for instance, be populated by user entries of photographs of views of interiors with correlated user identifications of features 120, and/or with three-dimensional views generated in previous iterations of methods as described in this disclosure. Modeling device 104 may, in an example, prompt a user to photograph one or more views of interior space that has been constructed according to models and/or data structures 112 as generated in iterations of methods and/or method steps described in this disclosure, identify objects in the form of geometrical figures in the photographs as described above, and create training data entries in object classifier 148 training set with the photographs and correlated features 120; in an embodiment, correlations may be further identified by matching locations of features 120 in a coordinate system used in a three-dimensional view to locations of geometric objects in a photograph, by receiving user identifications or "tags" of particular features 120, or the like.

In an embodiment, and still referring to FIG. 1, object classifier 148 may be used in combination with other processes and/or components described in this disclosure. For instance, and without limitation, user may request a global attribute 124, feature 120, and/or attribute to be used in data structure 112 by photographing another interior space that the user wishes to emulate in some way; objects in a resulting photograph may be classified as before, identifying features 120 in the photograph. Identified features 120 may be displayed to user for potential selection for placement in data structure 112 and/or first three-dimensional model 136. Modeling device 104 may alternatively or additionally identify a global attribute 124 such as without limitation a global style attribute using identified feature 120 or features 120, which may be implemented according to any process as described above, including without limitation querying global attribute database 500, inputting a feature 120 and/or feature 120 combination to a global style classifier 132, or the like.

With continued reference to FIG. 1, a global attribute 124 such as a global style attribute may be selected based on a location-related element of data. For instance, global attribute database 500 may store regional affiliations of global attributes 124, where "regional affiliations" may include elements of data describing geographical locations where a given style is prevalent. Regional affiliations may include, without limitation, regional architectural influences, such as tendencies toward colonial architecture in New England or Spanish influences in Southern California, regional interior design influences, such as a tendency toward Art Deco in New York City. In an embodiment, modeling device 104 may automatically generate a global style attribute based on a user-entered location, which may represent a location of a region whose style a user wishes to emulate; alternatively or additionally, modeling device 104 may determine a location of user and/or interior space based upon a user device's navigational systems such as without limitation Global Positioning System (GPS) and/or a recorded or received physical address and/or geographical location of interior space. As a further non-limiting example, global style attribute may be set by determining and/or receiving an architectural style of an exterior of a building containing interior space and identifying a matching global style attribute. Global style attribute may alternatively or additionally be selected using a global style attribute of another internal space in the same building as internal space; the global style attribute of the other internal space may have been set in a previous iteration of a method or method step as described in this disclosure, by a user identification thereof, by analysis and/or object classification performed on a user photograph of the other internal space, or the like.

Continuing to view FIG. 1, modeling device 104 may be configured to generate one or more additional models 164*a-b* of interior space, each of which may be generated according to any process suitable for generation of three-dimensional model as described above. In an embodiment, one or more additional models 164*a-b* of interior space may have matching or identical attributes to three-dimensional model; for instance, each additional model 164*a-b* may have the same global style attribute as three-dimensional model. In an embodiment, three-dimensional model and additional model 164*a-b* are all elements of an interior space data structure 112 representing a larger portion of interior space than that represented in any one of three-dimensional model and/or additional model 164*a-b*; interior space data structure 112 may represent the entirety of interior space. Interior space data structure 112 may have any or all attributes suitable for use as attributes of three-dimensional model, including without limitation global style attribute; in an embodiment, some or all attributes of three-dimensional model may be stored at the interior space data structure 112. Each additional model 164*a-b* may be generated dynamically; for instance when a user enters a command to rotate or otherwise modify an orientation of a view of interior space, an additional model 164*a-b* may be generated by modification of three-dimensional model. Interior space data structure 112 may contain data representing any features 120 or portions of features 120 of a model of internal space that is not included in the view provided by three-dimensional model; these may be considered features 120 of three-dimensional model for purposes of methods herein whether they are depicted in three-dimensional model or not.

Still referring to FIG. 1, a second attribute 156 of plurality of attributes 116 may be exterior to the first three-dimensional model 136. In an embodiment, an attribute is "exterior" to first three-dimensional model 136 where, the attribute is not localized to the first 3D model. For instance, and without limitation, the second attribute 156 may be a global attribute 124 such as a style attribute, cost attribute, or the like, which may be associated with first feature 140 in addition to data structure 112 generally. Second attribute 156 may include an attribute of a second feature 160 that is not in first three-dimensional mode. Second attribute 156 may be an attribute common to two features 120. Second attribute 156 may be an infrastructural attribute such as structural support, wiring, plumbing, or the like. Populating plurality of attributes 116 may include generating the second attribute 156 using first attribute 144; for instance, where first attribute 144 includes a given amount of weight on a wall-mounted feature 120, second attribute 156 may include an associated structural attribute requiring a stud or other supporting element to be present in a wall where the wall-mounted feature 120 is located, which modeling device 104 may use to select second attribute 156. Populating the plurality of attributes 116 may include generating the second attribute 156 as a function of first feature 140; for instance, first feature 140 may be associated in feature attribute table 308 with an infrastructural attribute such as a requirement to be connected to an electrical, gas, and/or water supply, which modeling device 104 may use to select second attribute 156. Second attribute 156 may alternatively or additionally be selected by modeling device 104 using a global attribute 124, for instance as described above; second attribute 156 may, for instance, be an attribute of a feature 120 generated as a function of a global attribute 124 such as global style attribute, where the feature 120 in question is "off screen" for first three-dimensional view.

Still referring to FIG. 1, modeling device 104 is configured to display the first three-dimensional model 136 to a user. This may be accomplished according to any suitable method for display of a three-dimensional model on a display of a computing device and/or in a graphical user interface. In an embodiment, event handlers in graphical user interface may enable user to select one or more features 120 displayed with first three-dimensional model 136, where selection may enable user to click and/or tap and drag one or more features 120 from one location to another in first three-dimensional model 136, to view and/or modify a list of attributes of and/or associated with a selected feature 120, or the like. Modeling device 104 may be further configured to receive a user command switching to a second three-dimensional model, which may be generated upon receiving user command; user command may include a user selection of a directional arrow to "pan" view to a different portion of internal space, which may be overlapping with and/or distinct from the portion displayed in first three-dimensional model 136, a user click-and-drag pan to a view of a different portion of internal space, or the like. Any process, method, method step, and/or configuration described in this disclosure regarding first three-dimensional model 136 may alternatively or additionally be applied regarding second three-dimensional model.

Further referring to FIG. 1, display of three-dimensional model 136 and/or any other model to user may be performed using any suitable user interface types as described in this disclosure, including without limitation personal computers, desktop computers, laptops, tablets, mobile devices, and/or web browsers. Display may be performed via a native application such as a mobile application, as a plug-in and/or modification of a CAD program, using a client-side program generated and/or provided by way of a web browser or other client-device program and/or application, or the like.

With continued reference to FIG. 1, modeling device 104 is configured to receive at least a command to modify the first attribute 144. Command may be entered by a user, for instance, and without limitation using any manual or other data entry device or component incorporated in or operating with modeling device 104. Command may add one or more features 120 to three-dimensional model, for instance by selection, dragging and dropping or other processes as described above. Command to modify may include a command to remove one or more features 120 from three-dimensional model; for instance, and without limitation, a user may select one or more features 120 using a cursor or the like and drag the one or more features 120 out of the three-dimensional model or select a "delete" or "remove" button or similar command. Another command that may be provided may be a "clear" option which may remove all features 120 except, for instance, those representing walls, structural ceilings, and floors, permitting user to repopulate interior space with a novel design. User may enter a command to change global style attribute; this may cause features 120 currently in three-dimensional model to be replaced with default features 120, such as those described above, associated with global style attribute.

Still referring to FIG. 1, receiving the at least command to modify the three-dimensional model may include receiving at least a command including a change to a first feature 140 of the three-dimensional model. For instance, user may enter a command or instruction to change a color, shape, style, material, or other attribute of a first feature 140; command may be entered by selection in one or more drop-down menus or the like of options corresponding to feature 120. For instance, and without limitation, one drop-down menu may offer various colors from which user may select a desired color, while another menu may offer materials, or styles of carving, or other attributes a user may vary to achieve a desired effect. In an embodiment, the at least a command to modify the first feature 140 may include a command to replace first feature 140 with a second feature 160, and the second feature 160 may have an attribute differing from the first attribute 144; in other words, the attribute of the second feature 160 may have an identical attribute type, but a different attribute value.

In an embodiment, and still referring to FIG. 1, receiving at least a command may include receiving at least a user goal, and modifying first feature 140 as a function of the at least a user goal. At least a user goal may include, without limitation, a manufacturing time goal, such as a goal to finish a remodeling and/or construction of, and/or installation of features 120 within, interior space within a certain number of man-hours, by a certain calendar date or the like. At least a user goal may include an energy consumption goal, which may specify that first feature 140 and/or all features 120 in interior space should consume less than a certain amount of electrical energy, gas, or the like. At least a user goal may include a cost goal, specifying a maximal cost user is willing to spend on first feature 140 and/or interior space as a whole. Persons skilled in the art, upon reviewing the entirety of this disclosure, will be aware of various alternative or additional goals that modeling device 104 may receive from a user. Modeling device 104 may be configured to automatically select a first feature 140 to match the at least a user goal. Where at least a user goal is a single goal, such as a maximal cost for first feature 140 and/or internal space as a whole, modeling device 104 may query feature database 300 for a set of features 120 matching the goal; feature database 300 may, for instance, list a cost of each feature 120 as an attribute thereof, which may be compared to a feature 120 cost goal via numerical comparison and/or to an overall cost goal for interior space by aggregating feature 120 cost with costs of features 120 and/or attributes already selected the interior space and comparing the aggregated cost to an overall cost goal, and/or dividing the overall cost goal into a cost per feature 120, and comparing feature 120 to that cost per feature 120 as described above. In an embodiment, user may be provided with a warning or other message indicating where a feature 120 will exceed a cost goal for that feature 120, or selection of the feature 120 may cause an aggregate cost to exceed an overall cost goal; user may be able to modify first feature 140 and/or one or other features 120 or production parameters affecting cost at user discretion. Further examples for processes usable for calculation of costs are provided below.

Alternatively or additionally, and continuing to refer to FIG. 1, modeling device 104 may be configured to select and/or propose a first feature 140 as a function of two or more user-specified goals. This may be accomplished, as a non-limiting example, by assembling a feature 120 goal vector representing a plurality of user-specified goals. A feature 120 goal vector as used herein is a data structure 112 that represents a quantitative measure of a degree of importance a user places on each of a plurality of user goals, including without limitation, cost, production time, quality of materials, longevity of materials, popularity of a feature 120, and/or energy consumption. A feature 120 goal vector, as defined in this disclosure, is n n-tuple of values, where n is at least two values, as described in further detail below. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other, however "vector" as used herein is not necessarily limited to a particular mathematical or geometric definition thereof. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l=\sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance be advantageous where each vector represents a weighing of user priorities, and/or is to be compared to such a weighing of user priorities. Feature 120 goal vector may include a plurality of goal vector entries, which are attributes of feature 120 goal vector as described above. Each of plurality of goal vector entries may represent any user-specified goal as described above Persons skilled in the art, upon reviewing the entirety of this disclosure, will be aware of various additional attributes that may be used for goals in feature 120 goal vector.

Still referring to FIG. 1, modeling device 104 may derive feature 120 goal vector by receiving at least a user input. For instance, a graphical user interface may display at user device options to rate one or more priorities absolutely and/or relatively to each other, for instance by providing a numerical rating scale with radio buttons and/or drop-down lists, sliders where a user may set relative importance along a continuum for each feature 120 goal vector attribute, and/or textual entry fields wherein a user may enter numbers reflecting user's personal degree of importance for each field. Such selections, whether normalized or not, may be recorded and/or analyzed as weights applicable to one or more attributes of features 120 and/or data structure 112. Features 120 selected in data structure 112 and attributes not associated with features 120 alike may be combined using vector addition, normalization, and the like; as a result, a single feature 120 may be represented as a vector having values corresponding to values in feature 120 goal vector, while a combination of two or more features 120 and/or attributes, including without limitation a combination of all features 120 and/or attributes listed in and/or associated with data structure 112 may be represented as such a vector for purposes of comparison to feature 120 goal vector.

With continued reference to FIG. 1, modeling device 104 may designed and configured to select a vector representing a feature 120, combination of features 120, and/or combination of features 120 with attributes, using a loss function by generating a loss function of the plurality of vectors representing features 120, combinations of features 120, and/or combinations of features 120 with attributes and feature 120 goal vector, minimizing the loss function, and selecting a vector from the plurality of vectors representing features 120, combinations of features 120, and/or combinations of features 120 with attributes as a function of minimizing the loss function; a first feature 140 may be selected from and/or presented using a vector selected via minimizing the loss function, for instance by tracking, in memory of modeling device 104, which features 120 and/or attributes were used to generate vectors input to the loss function. A "loss function," as used herein is an expression of an output of which an optimization algorithm minimizes to generate an optimal result. As a non-limiting example, modeling device 104 may select a feature 120, combination of features 120, and/or combination of features 120 with attributes having an associated vector that minimizes a measure of difference from feature 120 goal vector; measure of difference may include, without limitation, a measure of geometric divergence between vector representing feature 120, combination of features 120, and/or combination of features 120 with attributes and feature 120 goal vector, such as without limitation cosine similarity, or may include any suitable error function measuring any degree of divergence and/or aggregation of degrees of divergence, between attributes of feature 120 goal vector and vector representing feature 120, combination of features 120, and/or combination of features 120 with attributes. Selection of different loss functions may result in identification of different vectors as generating minimal outputs. Alternatively or additionally, each of feature 120 goal vector and each vector representing a feature 120, combination of features 120, and/or combination of features 120 with attributes may be represented by a mathematical expression having the same form as mathematical expression; modeling device 104 may compare the former to the latter using an error function representing average difference between the two mathematical expressions. Error function may, as a non-limiting example, be calculated using the average difference between coefficients corresponding to each variable. An intervention having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers. Server may select a plurality of features 120, combinations of features 120, and/or combinations of features 120 with attributes to user; for instance, ranking may be maintained of features 120, combinations of features 120, and/or combinations of features 120 with attributes according to a degree to which they minimize loss function, and a number of highest-ranking features 120, combinations of features 120, and/or combinations of features 120 with attributes, such as the ten highest ranking features 120, combinations of features 120, and/or combinations of features 120 with attributes or the like, may be selected and/or displayed to user.

In an embodiment, and still referring to FIG. 1, modeling device 104 may be configured to present selected features 120, combinations of features 120, and/or combinations of features 120 with attributes and/or features 120, combinations of features 120, and/or combinations of features 120 with attributes to user; for instance, each selected vector, and/or a feature 120 matching a user's initially requested feature 120 type as represented in each selected vector, may be presented. This may, in an embodiment, have the result that the user is able to see an impact on one or more user-specified goals as represented by a feature 120, combination of features 120, and/or combination of features 120 with attributes. Modeling device 104 may additionally select a feature 120, combination of features 120, and/or combination of features 120 with attributes maximizing impact on one particular goal such as without limitation cost, for instance by running loss function against a vector having all elements except that one goal set to zero; this may be displayed as well to inform the user of a maximal possible impact on cost, giving user an additional way to view feature 120 selection. In an embodiment, modeling device 104 may receive user input modifying feature 120 goal vector, for instance as described above; modeling device 104 may repeat above-described processes for selection of one or more features 120, combinations of features 120, and/or combinations of features 120 with attributes, including any cost-function process, and display selected features 120, combinations of features 120, and/or combinations of features 120 with attributes a second time.

With continued reference to FIG. 1, modeling device 104 may filter suggested and/or automatically selected features 120 using one or more filtering criteria. A "filtering" criterion, as used in this disclosure, is a goal that modeling device 104 treats as an absolute requirement; in other words, features 120 and/or attributes that do not meet a filtering criterion may be excluded from any set of suggested and/or selected features 120 and/or attributes. In an embodiment, modeling device 104 may provide a user with an option to identify one or more "required" or mandatory goals, which modeling device 104 may treat as filtering criteria, while other goals may be treated as "goals" as described above, to which loss function or other balancing or optimization approaches may be performed for the purposes of ranking features 120 and/or attributes. As a non-limiting example, a user may set as a filtering criterion a maximum cost per feature 120, a cost for a particular feature 120, and/or an overall cost for the interior space, such that no feature 120 is selected that causes the maximum cost to be exceeded; a number of additional goals, which may be any goals as described above, may be specified by the user and subjected to a loss-function analysis to produce a ranked list of all features 120 fulfilling the filtering criterion. There may be multiple filtering criteria, in which case features 120 may be selected to fulfill all filtering criteria.

Still referring to FIG. 1, a user may be provided with one or more options to select filtering criteria and/or goals; one or more options may be provided, for instance, as checkboxes allowing user to select one or more criteria on the basis of which to include or exclude suppliers and/or features 120, such as union versus non-union labor. One or more options may include means to permit user to select degrees along a continuum of choices, such as a slider allowing using to select between rapid completion time and slower completion time, higher and lower cost, or the like. Options may alternatively or additionally be provided to user in a "good-better-best" format, allowing user to make rapid tradeoff choices between potentially conflicting or otherwise balanced goals and/or filtering criteria, such as cost and quality. As a further non-limiting example, cost calculation may be weighted and/or otherwise calculated differently for different parts of a building; for instance, separate modules for cost calculation for items such as back of house (BOH), common area, resident rooms may be provided to the user. Modules may be further subdivided and/or allocated by further categories such as without limitation categories associated with low voltage items, lighting, kitchen equipment, plumbing, heating, ventilation, and air conditioning (HVAC) items and systems, security items and systems, roof, basement, parking, high technology, and the like. Persons skilled in the art, upon reviewing the entirety of this disclosure, will be aware of various ways in which costs may be categorized, calculated, and/or modified based on user inputs, and of various ways in which such user inputs may be received or collected.

With continued reference to FIG. 1, where user command causes modeling device 104 to return one or more features 120 to match a user goal, for instance according to any methods described above, one or more features 120 in or associated with three-dimensional model and/or interior space data structure 112, and/or one or more suppliers capable of providing and/or installing one or more items represented by features 120, may be filtered according to one or more criteria, including without limitation such as union versus non-union labor, local sourcing, particular materials, preferred suppliers of users, or the like. Calculations of price may be performed on a per-item basis, a per-unit (length, area, volume) basis, or the like; classifications of either design elements, suppliers, or installers may be retrieved from, e.g., a database or data structure 112 storing such information to derive bases for filtering. Persons skilled in the art will be aware, upon reviewing the entirety of this disclosure, that any factor that may affect cost calculation for a feature 120, interior space, attribute, and/or data structure 112 as described in further detail below may be associated with a feature 120 and/or data structure 112 as an additional attribute, and may be subject to a filtering criterion and/or goal.

Still referring to FIG. 1, in an embodiment, modeling device 104 is configured to modify the first three-dimensional model 136 as a function of the at least a command to modify the first attribute 144. As a non-limiting example, where command includes at least a command to including a change to a first feature 140 of the three-dimensional model, modifying may include modifying the three-dimensional model based on the at least a command; for instance, first feature 140 may be modified based on the command by modifying a geometric or other visual representation of first feature 140 based on modifications. One or more attributes may be modified as well, for instance where command specifies a change to one or more attributes. Where a new feature 120 is inserted, visual representation of feature 120 may be modified to match interior space and/or other features 120 thereof; this may include detecting dimensions and/or shape of the interior space, and forming feature 120 based on detection; for instance, where feature 120 represents a recessed ceiling, recess may have a shape based on a shape of a room or corridor containing recess, such as a cross-sectional form proportional to but smaller than a cross-sectional form of the room, or the like. Geometry of visual element of feature 120 may be modified to reflect a perspective view of portion of interior space, or to fit dimensions or shape or room in any of various other ways that may occur to persons skilled in the art upon reviewing the entirety of this disclosure.

In an embodiment, and continuing to refer to FIG. 1, where first feature 140 has at least a first attribute 144, as described for instance above, at least a command may include a command to modify at least a first attribute 144, for instance as noted above. Alternatively or additionally, command may have consequence of modifying at least an attribute of first feature 140; for instance, a user selection overwrite one feature 120 with another, replacing one or more attributes of feature 120 with one or more different attributes. As a further example, changing length, breadth, material of feature 120 may change a weight attribute; changing a color or output intensity of a light fixture may trigger a change in attributes representing electrical properties of the fixture.

In an embodiment, and with continued reference to FIG. 1, modeling device 104 may impose one or more limits on modifications to features 120, which may be based, as a non-limiting example, on practical or budgetary limits to physical modifications that may be made to an interior space corresponding to three-dimensional model. For instance, and without limitation, making architectural changes to structural elements such as load-bearing walls in the interior space may be out of scope; modeling device 104 may determine that at least a command requires a modification to first feature 140 that would violate such a limit, such as by requiring a modification to a load-bearing wall, and may prevent the modification to first feature 140 as a result. As a further example, at least a command may call for a modification to an attribute of first feature 140 that necessitates a modification to an attribute of second feature 160 that violates the limit or requires a modification to second feature 160 itself that violates the limit.

Still referring to FIG. 1, modeling device 104 may be designed and configured to modify second attribute 156 as a function of modification to first attribute 144. For instance, and without limitation, modeling device 104 may determine that a change to first attribute 144 conflicts with second attribute 156; for instance, a mismatch between at least a first attribute 144 and at least a second attribute 156 may be indicative of one or more practical consequences of a modification to first feature 140 that require corresponding modifications to at least a second attribute 156 and/or to second feature 160. Such practical consequences may include, for instance, a heavier or different sized doorframe, as represented by second feature 160 needed for a different door as represented by first feature 140, for instance where first feature 140 is modified to represent a door constructed of heavier material, having a different thickness, having a different location or form of latch, or the like. Practical consequences may include a need to reroute or modify wiring to match electrical consumption needs introduced and/or modified for first feature 140; first feature 140 may, for instance, require wiring to be run through or around second feature 160, require greater current capacity than a circuit containing or connected to second feature 160, or the like. As a further non-limiting example, a style attribute of first feature 140 may correspond to a style attribute that is not consistent with a style attribute second feature 160, which may be a global style attribute as described above and/or a local style attribute; modeling device 104 may, without limitation, modify global style attribute upon determining that modification to first feature 140 is consistent with a differing global style attribute and modify at least a second attribute 156 by replacing it with an attribute having a value consistent with the differing global style attribute.

With continued reference to FIG. 1, modeling device 104 may store in memory, such as in a database table and/or data structure 112 as described above, such as feature database 300, attribute database 400, and/or global attribute database 500, one or more relationships between a first attribute 144 and at least a second attribute 156, and/or one or more relationships between first feature 140 and second feature 160. For instance, and without limitation, first feature 140 may include an attribute indicating items with which item represented by first feature 140 are typically paired. As an illustrative example, a feature 120 representing a molding may have an attribute indicating that it typically, or by default, is paired with a baseboard; attribute or additional attributes may impose rules on a second feature 160 representing a baseboard and on first feature 140, whereby a change to color of one triggers modeling device 104 to make a corresponding change to the color of the other one, for instance to match colors, or a change to a carving style of one may trigger a change to a carving style of the other. Such changes may be performed automatedly, or provided to a user, for instance via a user interface, as an option the user may select or reject causing the change to be made or not made, respectively. Such rules may be alternatively or additionally stored in a separate data structure 112 linking rules to features 120. Rules may be entered by users, extracted, or obtained from data describing items represented by feature 120 such as without limitation manufacturer or supplier data, and/or derived by collecting statistical correlations between features 120 in uses of system 100 and/or iterations of method 400 performed by current user, all users, or some subset of users.

Still referring to FIG. 1, change to attribute of first feature 140 may include a change to an effect item such as a lighting attribute represented by first feature 140 has on lighting in internal space; such changes may include, without limitation, changes representing increased or decreased light output from light fixtures, decreased or increased light admitted by windows, addition of shades, frosted glass, or other elements that occlude or reduce light output or transmittance, increases or decreases in reflectiveness of item, increases or decreases in fluorescence or phosphorescence, increases or decreases in opacity or translucence, or the like. At least a second attribute 156 may include a pattern of light and/or shadow cast on visual representation of second feature 160 and may be modified to reflect change; visual representation of second feature 160 may be changed accordingly as well. Alternatively or additionally, light and shadow patterns in three-dimensional model may be tracked and represented as an attribute of three-dimensional model and/or of interior space data structure 112 containing the three-dimensional model.

Continuing to refer to FIG. 1, visual representation of second feature 160 may be modified as a function of modification to first feature 140, at least a first attribute 144, at least a second attribute 156, and/or visual representation of first feature 140. Changes to visual representation of second feature 160 may include, without limitation, changes to a display of geometry, shape, size, color, texture, or any other aspect of physical appearance of second feature 160 as represented by the visual representation.

Still referring to FIG. 1, in an embodiment, modifying three-dimensional model nay include determining that command contains a modification to the at least a first attribute 144 and modifying global style attribute based on the modification to the at least a first attribute 144. For example, and without limitation, first attribute 144 may be linked to a different global style attribute than the current global style attribute; current global style attribute may be changed as a result. Modeling device 104 may determine this, without limitation, by retrieving global attributes 124 linked to first feature 140 having modified first attribute 144, and/or by determine whether first feature 140 as modified is classified to a new and/or differing global style attribute by global style classifier 132. A prompt may be provided to user inquiring whether the global style attribute should be changed; user may refuse, leading to no change to global style attribute, or accept, allowing change to global style attribute to proceed. In an embodiment, modeling device 104 may modify at least a second feature 160 based on modification to global style attribute; modification may be performed by modifying one or more attributes of at least a second feature 160, visual representation of at least a second feature 160, or the like. Modification may include populating three-dimensional model with a plurality of features 120 consistent with modified global attribute 124 as described above; features 120 in data structure 112 and/or additional model 164*a-b* as described above may also be updated. Alternatively or additionally, a style attribute or attribute linked to global style attribute of first feature 140 may be modified to match current global style attribute instead of global style attribute being modified; a user may be provided with one or more prompts allowing user to select modification to feature 120 attribute or attributes, global style attribute, neither, or both.

With continued reference to FIG. 1, and as noted above, modeling device 104 may check any or all modifications as described above against a design decision tree 200, where present, for instance by comparing modifications to selections in one or more nodes of design decision tree 200; design decision tree 200 may be modified as a result. Alternatively or additionally a message may be generated informing a user that modifications will modify one or more nodes of design decision tree 200 and/or one or more previously made selections, and user may have option to accept such modifications and/or override such modifications. In an embodiment, where one or more modified and/or replaced features and/or attributes are modifications to and/or replacements of features and/or attributes represented by nodes and/or selections in decision tree, modifications and/or replacement of such feature and/or attributes may trigger automatic modification and/or replacement of such nodes and/or selections in design decision tree 200.

Still referring to FIG. 1, the processor displays, using the user display device, a modified three-dimensional model. As used in this disclosure, a "modified three-dimensional model" is a three dimensional virtual representation of an object, structure, or environment that has been altered or updated from its original form. In a non-limiting example, the modified three-dimensional model may include changes to the geometry, textures, materials, and/or other attributes of the scene. In another non-limiting example, the modified three-dimensional drawing may include adjustments plurality of attributes 116, including, without limitation first attribute 144 and second attribute 156.

With continued reference to FIG. 1, system 100 is further configured to generate a smart contract associated with the modified three-dimensional model. In an embodiment, each time the modified three-dimensional model is updated, a smart contract may facilitate a financial agreement to reflect the changes of the modified three-dimensional model. A "smart contract," as used in this disclosure, is an algorithm, data structure, program, and/or a transaction protocol which automatically executes, controls, documents, and/or records legally relevant events and actions according to the terms of a contract or an agreement. The smart contract may include requirements, terms, rules, conditions, or the like thereof, dictating an upstream royalty payment to the source of each financial variable as discussed in more detail below. Objectives of smart contracts may include reduction of need in trusted intermediators, arbitrations and enforcement costs, fraud losses, as well as the reduction of malicious and accidental exceptions. In a non-limiting embodiment, computing device may generate a smart contract using electronic signatures from plurality of stakeholders to be verified and/or validated via immutable sequential listing 700 and/or any minimum number of nodes associated with immutable sequential listing 700. In another non-limiting embodiment, the computing device may generate a security token entry containing a smart contract denoted by a conditional trigger. A "conditional trigger," as used in this disclosure, is an occurrence and/or condition which, once are met, deploys an update involving a token entry on immutable sequential listing 700. In some non-limiting embodiments, the conditional trigger may include a smart contract. In a non-limiting embodiment, each token entry and its associated smart contract can contain conditional triggers. In some non-limiting embodiments, a conditional trigger may include elements defining conditions, rules and/or terms to be met to enable a smart contract to deploy any token entry on immutable sequential listing 700. For instance, for each token to be recognized and added on immutable sequential listing 700, a conditional trigger of a smart contract may include a requirement that a user returns a minimum capital amount and a borrowed cryptographic resource back to a resource-backed entity. Another example of a conditional trigger may include a condition that the borrowed cryptographic resource is returned at an expiration of a specific time period. Person of ordinary skill in the art, upon reviewing the entirety of this disclosure, will be aware of the various embodiments of conditional triggers in the context of satisfying a smart contract for purposes as described herein.

With continued reference to FIG. 1, system 100 may be further configured to execute the smart contract, wherein executing the smart contract comprises receiving, a digital signature from a plurality of stakeholders and validating the digital signature from a plurality of stakeholders. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

As used in this disclosure, a "stakeholder" is an individual, group, organization, or entity that has an interest in or is affected by the outcome of a decision or activity. In a non-limiting example, the stakeholder may include a single person, an architecture firm, a construction company, a project developer, an interior designer, a property owner, and the like. In another non-limiting example, the stakeholder may include government entities and/or regulatory bodies.

The system of claim 11, wherein generating the smart contract comprises generating a serial identifier, wherein the serial identifier is assigned to each instance of the smart contract. As used in this disclosure, "serial identifier" is a unique, non-changing alphanumeric set of characters of any length for each instance of the smart contract received by the processor. The serial identifier may include entries to be verified on the immutable sequential listing. For example, the serial identifier may include transaction and/or block entries that may be verified on the immutable sequential listing. For example, an immutable sequential listing may be able to verify a source of each data set used to generate an accumulated model. Each of the data sets used may be an entry on the immutable sequential listing. In an embodiment, entries can be verified by a quorum of participants, nodes, or the like thereof.

With continued reference to FIG. 1, system 100 may further utilize a cryptographic system wherein the cryptographic system validates the digital signature of the smart contract from the plurality of stakeholders. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption". The decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Strecbog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving kcy and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

With continued reference to FIG. 1, smart contract may include a time-varying signature input, which may have a time limit after which time-varying signature input is no longer valid. Time limit may be calculated from an initial time, which may be a datum linked to a particular timestamp or other value representing a fixed moment in time, associated with time-varying signature input; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a “secure timestamp” is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

With continued reference to FIG. 1, system 100 may include performing a trusted time evaluation of the digital signature by computing device. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a signature input is an authentic signature that has the property of attested time. Generating a secure timestamp may be used to weed out spoofers or “man in the middle attacks.”

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using signature input. Additional data may include one or more additional data, including signature input, which are received by the processor. Additional data may be hashed into a Merkle tree or other hash trec, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g., a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g., textual data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, signature input storage or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, system 100 may include a machine learning model, wherein the machine learning model is trained using a plurality of executed smart contracts. As used in this disclosure, an “executed smart contract” is a contract that has been successfully deployed on a blockchain network and has gone through the process of execution, wherein the predefined conditions have been met and the code has run to completion. In a non-limiting example, a smart contract option may use blockchain technology as described in more detail in FIG. 7. In a non-limiting example, the smart contract may facilitate the contracting process by enabling the users, once a final decision is made, to move forward with the project that was created and every stakeholder involved in the project (i.e., the owner, contractor, interior designer, architect, engineer, etc.) may electronically sign the smart contract. Continuing, the aforementioned signatures may get stored together with the project data and held in a blockchain based token within a private blockchain and may be utilized by all stakeholders as a visual and financial agreement that all parties must abide by throughout the project. Continuing the previous non-limiting example, this processes may enable a user to create accountability to the visual and the financial base of the project. For example, without limitation, a contractor cannot question whether the owner wanted 8 foot or 10 foot ceilings or the reverse. Continuing the previous example, the decision may be stored in the signed blockchain token and thereby immutable. Continuing, this process may help guarantee that the stakeholders are held accountable to the financial elements of the deal, such as without limitation, the pricing and cost of the project. For example, if the contractor signed on the project costing the owner $5,000,000.00 then the owner and the contractor may be held liable to that amount specified. Continuing the previous example, if the owner and the contractor wanted to create a change order then they may create a duplicate of the project that was previously signed, make necessary changes to update the previously signed contract, and have all stakeholders sign the new change order project.

In a non-limiting example, the smart contract may provide all of the users involved in a project transparency and clarity, thereby enabling efficient and effective execution of project contracts with less cost overruns and time delays. In a non-limiting example, the smart contract feature may be an add-on feature for non-pro membership users but may be included as a part of the pro membership features. In a non-limiting example, the smart contract may be combined with apparatus 100 to create a construction project marketplace. Continuing, the construction project marketplace may be an innovative platform that enables owners, operators, financiers, trade workers, general contractors, interior designers, architects, engineers, and other stakeholders to create, virtually audit (both financially and visually), bid on, and partner on projects. Continuing, the previous non-limiting example, the aforementioned projects may be created within the software of apparatus 100 by any user or discovered as existing projects created by other users. Continuing, the previous non-limiting example, the construction project marketplace platform may enable a seamless integration of various stakeholders in the construction industry. For example, without limitation the construction project marketplace platform may permit any construction stakeholder to create and verify a marketplace account. Continuing, the construction project marketplace platform may verify the stakeholder. Continuing, once verified, the stakeholder may search the marketplace for biddable projects, where they can virtually view necessary project details such as Project SIC Code, Location, Detailed Project Budget, Project Proforma, 3D Visuals, and Project Stakeholders Committed via smart contract signature. Continuing the previous non-limiting example, based on the smart contract details, stakeholders can decide whether to place a bid on the project. Additionally, without limitation, the smart contract may facilitate the bidding process. In another non-limiting example, apparatus 100 may allow for virtual auditing of the projects. Continuing the previous non-limiting example, the auditing may be both financial and visual, providing a comprehensive overview of the project's status and progress. Without limitation, the integration of smart contract features ensures that all commitments made by the stakeholders are securely recorded and verifiable, enhancing the transparency and accountability of the construction project marketplace. In a non-limiting example, apparatus 100 may provide a comprehensive platform for the creation, auditing, bidding, and partnering on construction projects, leveraging the power of smart contracts to enhance the efficiency and transparency of these processes. Continuing, this integration of smart contract features with traditional software functions may provide benefits to all stakeholders involved in the construction industry. In a non-limiting example, this comprehensive view allows stakeholders to decide if they are willing to place a bid on a project based on the detailed information provided, ensuring informed decision-making and fostering collaboration among various professionals in the construction industry.

In a non-limiting example, the machine learning model may be trained on a plurality of executed smart contracts which may include historical transaction data, to provide predictive analytics, intelligent decision making, and the like. Without limitation, the machine learning model may be trained using any training data described herein. Further, the machine learning model is described in more detail in FIG. 9.

With continued reference to FIG. 1, the machine learning model may include a neural network. As used in this disclosure, a "neural network" is a method in artificial intelligence that teaches computers to process data in a way that is inspired by the human brain. It is a type of machine learning process, called deep learning, which uses interconnected nodes or neurons in a layered structure that resembles the human brain, as discussed more in detail in FIG. 10 and FIG. 11.

With continued reference to FIG. 1, first feature 144 is associated with a financial variable, wherein the financial variable corresponds to a spatial datum. As used in this disclosure, a "financial variable" is a quantifiable factor that represents a specific financial aspect or measurement. In a non-limiting example, the financial variable may be used to analyze financial performance, make economic decisions, forecast future financial trends, and evaluate the health of a business or economic environment. In another non-limiting example, there may be one or more financial variables associated with first feature 144 and the financial variables may change over time due to various internal and external forces. As used in this disclosure, a "spatial datum" is a point that provides geographic information. In a non-limiting example, financial variable and spatial datum may be interdependent. In a non-limiting example, the cost of materials, labor, property, government taxes, and the like may be location dependent. For example, it may cost much more to build a commercial building in a highly populated city than it would be to build that same commercial building in a rural neighborhood in the outskirts of town. In another non-limiting example, first feature 144, like construction materials such as lumber, may have an increased financial variable for a new-build on an island, where the lumber must be shipped by boat, or otherwise to reach its destination, than the same new build on the mainland where only a truck is required to deliver the lumber to the construction site. In another non-limiting example, labor costs may differ depending on the spatial datum, where local wage standards, availability of skilled workers, and regional demand for construction services differ. In a non-limiting example, spatial datum may provide valuable insight to project planners on cost estimate of the build and/or renovation.

With continued reference to FIG. 1, a machine learning model may be used to calculate the financial variable. For example, without limitation, the machine learning model may be trained on a plurality of unstructured information associated with cost of business, materials, labor, and the like based on geographical locations throughout the world. In another non-limiting example, machine learning model may receive as input from a user, such as databases with may include the cost of rental equipment by geographical location and/or databases that show the cost of labor by geographical location, and the like. In a non-limiting example, machine learning model may output a calculated financial variable associated with a predefined spatial datum.

With continued reference to FIG. 1, machine learning model may include a locality machine learning model. Locality machine learning model may be configured to determine variables, related to features as disclosed above, that may depend on the location of the project, such as project completion timeframe, cost, and the like. In some embodiments, locality machine learning model may be trained using locality training data. Locality training data may include first features correlated to financial variables. In some embodiments, locality training data may include first features and locality data correlated to financial variables. In some embodiments, locality training data may be retrieved from a database. In some embodiments, locality training data may be scraped from the internet using a web crawler. "Locality data," for the purposes of this disclosure, is information related to the location of construction for a design or project. Locality data may include any geographic subdivision, such as country, state, province, country, city, zip code, town, village, geographic coordinates, mailing address, and the like. In some embodiments, system 100 may receive locality data from a user, such as through a user input. In some embodiments, locality machine learning model may be configured to receive first feature data and locality data and output a financial variable.

With continued reference to FIG. 1, input data may be transformed into a numerical representation using text vectorization, embedding, or feature extraction, to allow the machine learning model to process the data. In a nonlimiting example, input data may be transformed into numerical representations using vectors and/or matrices.

A "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ||a|| indicating the vector's length or size, and may be defined, as a non-limiting example, according to a Euclidean norm for an n-dimensional vector a as:

$$\|a\| = \sqrt{\sum_{i=0}^{n} a_i^2}$$

As used in this disclosure "matrix" is a rectangular array or table of numbers, symbols, expressions, vectors, and/or representations arranged in rows and columns. For instance, and without limitation, matrix may include rows and/or columns comprised of vectors representing various equipment, materials, and labor, where each row and/or column is a vector representing a distinct cost associated with the equipment, materials, and labor; the cost represented by vectors in matrix may include various costs associated with equipment, materials, and labor, as described above as determined from received input. As a non-limiting example matrix may include the cost of renting a bulldozer for a day in a specific geographical location, like Hawaii or Boston.

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{mxn} = U_{mxm} S_{mxn} V_{nxn}^T$$

singular value decomposition function may find eigenvalues and eigenvectors of $AA^T$ and $A^TA$. The eigenvectors of $A^TA$ may include the columns of VT, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, the financial variable may include a plurality of cost components. As used in this disclosure, a "cost component" are the individual elements or categories of expenses associated with a project. For instance, without limitation a cost component may include a line-item expense for a building, such as, furniture cost, floor cost, and the like. In another non-limiting example, the cost component is essential for creating accurate budgets and forecasts, ensuring all aspects of a project are financially accounted for. In another non-limiting example, the cost component may include material costs, labor costs, and equipment costs, which as previously mentioned may fluctuate and this fluctuation is reflected in the financial variable based on the spatial datum.

Figure 6:
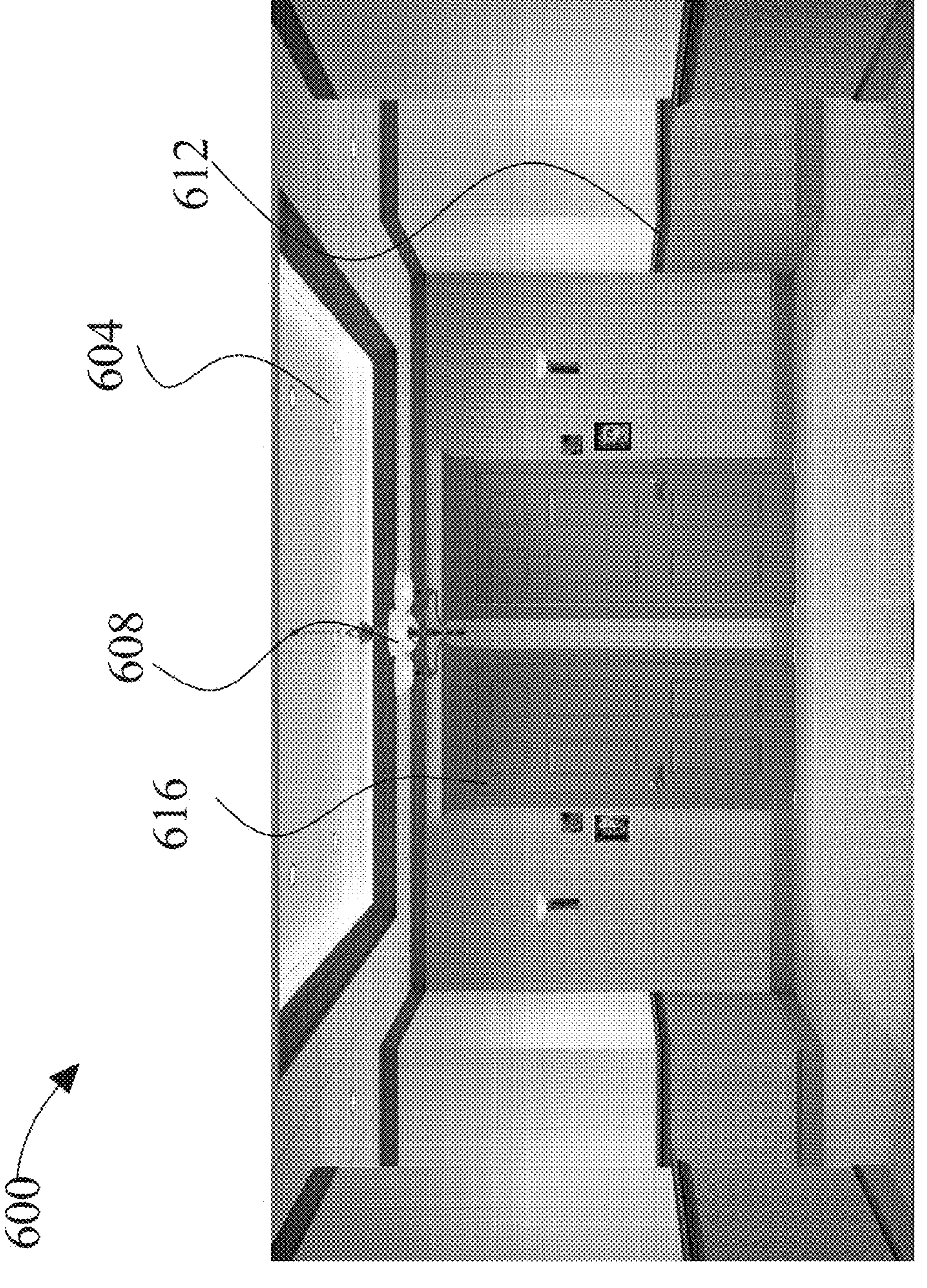
FIG. 6 illustrates screenshot of an exemplary embodiment of a three-dimensional model as described herein.

Referring now to FIG. 6, an exemplary embodiment of a screenshot 600 of three-dimensional model as described in this disclosure is illustrated. One or more visual representations of features 120 as described in this disclosure may include, without limitation, a visual representation of a ceiling 604 a light fixture 608, a chair rail 612, a door 616, or the like. Persons skilled in the art, upon reviewing the entirety of this disclosure, will be able to recognize various additional examples of visual representations of features 120 in screenshot 600. Examples of visual representations of attributes may also be seen, including without limitation a recess of ceiling 604, a chandelier hanging of light fixture 608, and other examples persons skilled in the art may be aware of upon reviewing the entirety of this disclosure. As a non-limiting example of interrelated attributes of features 120, chair rail 612 and door 616 may have complementary but distinct colors, while door may match baseboard color and chair rail may match a color of crown molding. The above-described examples are for illustrative purposes only and are not intended to be limiting.

Still referring to FIG. 6, models, displays, and/or processes may be presented and/or performed in the form of an interactive decision game that pieces together pre-designed modules, optionally with variations real time changing variables and variations, into established floor plans, site plans or into a blank slate environment. Each virtual 3D component, such as three-dimensional mode, 136 and/or features of plurality of features may include financial and/or spatial metadata that may be used to quantify decisions for a rapid and/or seamless process connecting such modules to produce a seamless building plan simulation fly-through and cost analysis. Each decision level, selection, and/or decision in any process described above, including without limitation selections of and/or at nodes in design decision tree 200, may provide three options of good, better, and best measured by costs and quality. Methods and systems provided in this disclosure may deliver and/or instantiate an operational module 3-d white box tool that allows a user to modify design options which will impact the design, square footage, cost and/or visual attributes of projects and/or designs. System 100 may present dials, toggles, and/or other controls accepting user modifications to overall space plan and costing; some of these controls may to be set in place at design onset, while others may be toggled on and off during planning. As such controls are adjusted, data structures such as design decision tree 200, data structure 112, features, and/or attributes may be adjusted accordingly, as well as an overall costing and/or space plan. A client proforma and/or other object and/or display element may be auto populated with construction costs, FF&E costs, and fees so that a user may review return on investment for various scenarios; such data may be saved along with decision tree instances and/or instances of previous and/or subsequent process iterations, permitting a user to run multiple scenarios and then compare them side by side.

Figure 7:
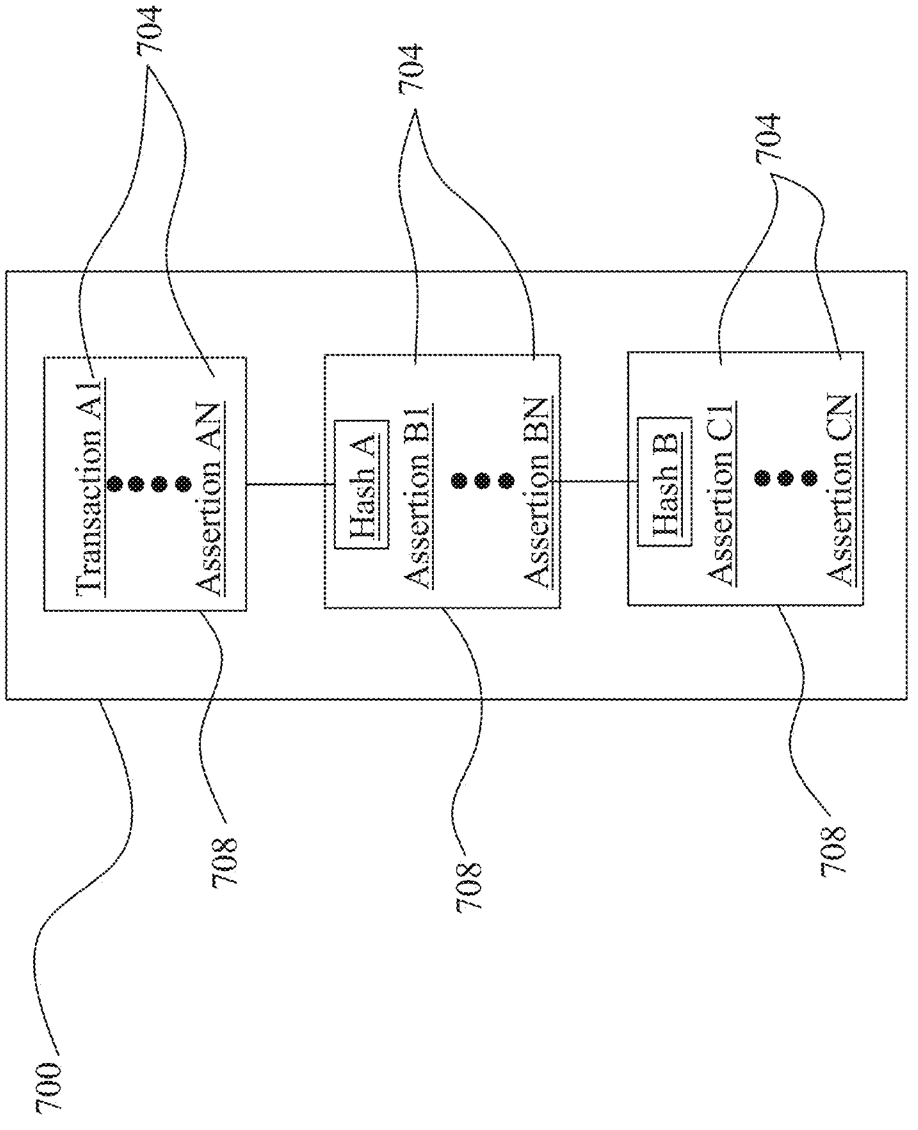
FIG. 7 is a block diagram of exemplary embodiment of an immutable sequential listing.

Referring now to FIG. 7, a block diagram of exemplary embodiment of an immutable sequential listing, 700. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 7, data elements are listing in immutable sequential listing 700; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704.

In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

Figure 8:
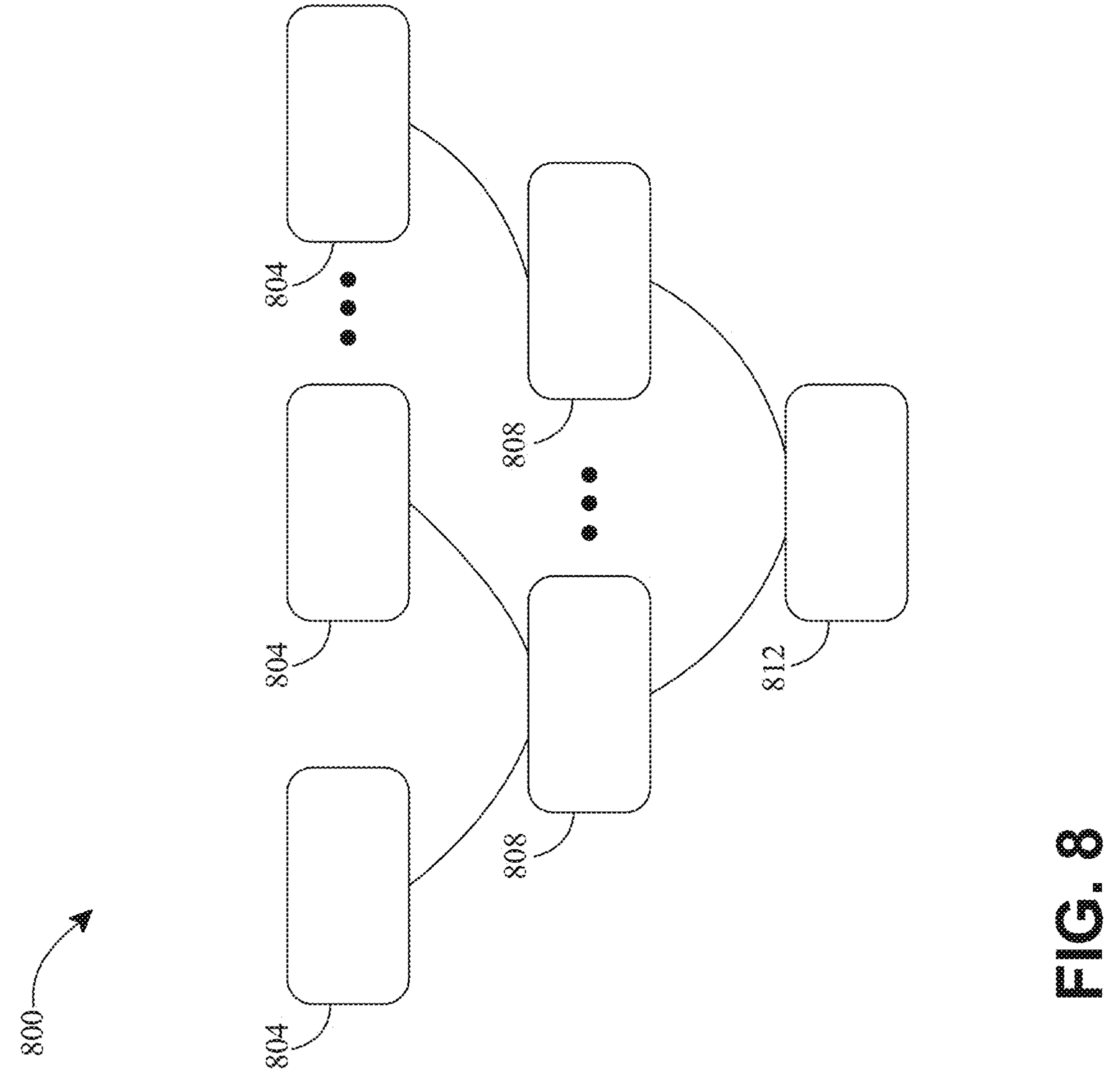
FIG. 8 is a diagram of an exemplary embodiment of a cryptographic accumulator.

Referring now to FIG. 8, an exemplary embodiment of a cryptographic accumulator 800 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 800 has a plurality of accumulated elements 804, each accumulated element 804 generated from a lot of the plurality of data lots. Accumulated elements 804 are create using an encryption process, defined for this purpose as a process that renders the lots of data unintelligible from the accumulated elements 804; this may be a one-way process such as a cryptographic hashing process and/or a reversible process such as encryption. Cryptographic accumulator 800 further includes structures and/or processes for conversion of accumulated elements 804 to root 812 element. For instance, and as illustrated for exemplary purposes in FIG. 8 cryptographic accumulator 800 may be implemented as a Merkle tree and/or hash tree, in which each accumulated element 804 created by cryptographically hashing a lot of data. Two or more accumulated elements 804 may be hashed together in a further cryptographic hashing process to produce a node 808 element; a plurality of node 808 elements may be hashed together to form parent nodes 808, and ultimately a set of nodes 808 may be combined and cryptographically hashed to form root 812. Contents of root 812 may thus be determined by contents of nodes 808 used to generate root 812, and consequently by contents of accumulated elements 804, which are determined by contents of lots used to generate accumulated elements 804. As a result of collision resistance and avalanche effects of hashing algorithms, any change in any lot, accumulated element 804, and/or node 808 is virtually certain to cause a change in root 812; thus, it may be computationally infeasible to modify any element of Merkle and/or hash tree without the modification being detectable as generating a different root 812. In an embodiment, any accumulated element 804 and/or all intervening nodes 808 between accumulated element 804 and root 812 may be made available without revealing anything about a lot of data used to generate accumulated element 804; lot of data may be kept secret and/or demonstrated with a secure proof as described below, preventing any unauthorized party from acquiring data in lot.

Alternatively or additionally, and still referring to FIG. 8, cryptographic accumulator 500 may include a "vector commitment" which may act as an accumulator in which an order of elements in set is preserved in its root 812 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 800 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 9:
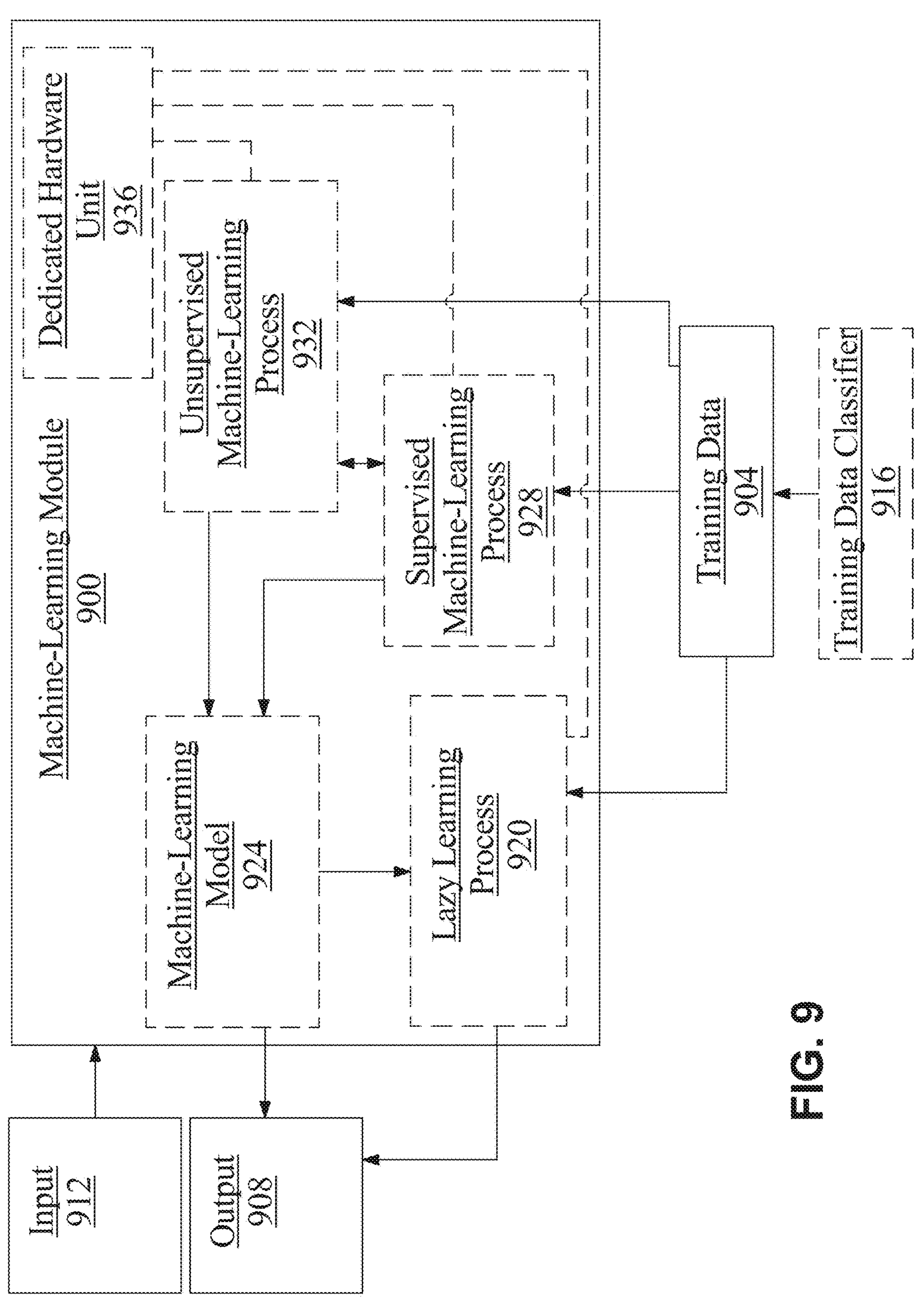
FIG. 9 is a block diagram of an exemplary machine-learning process.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm instantiated in hardware or software logic, data structures, and/or functions that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example inputs including a plurality of executed and/or empty smart contracts and outputs including one or more smart contracts that contain the terms of agreement necessary for a transaction.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 916 may classify elements of training data to analyzed items such as industry specific contracts, types of contracts, and the like.

Still referring to FIG. 9, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being truc regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 9, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 9, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 9, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 9, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 9, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 9, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 9, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 9, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 9, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 9, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include executed contracts as described above as inputs, transaction specific formatted smart contracts as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

With further reference to FIG. 9, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 9, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 932 may not require a response variable; unsupervised processes 932 may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 9, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 9, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 9, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 9, one or more processes or algorithms described above may be performed by at least a dedicated hardware unit 936. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 936 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 936 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 936 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 10:
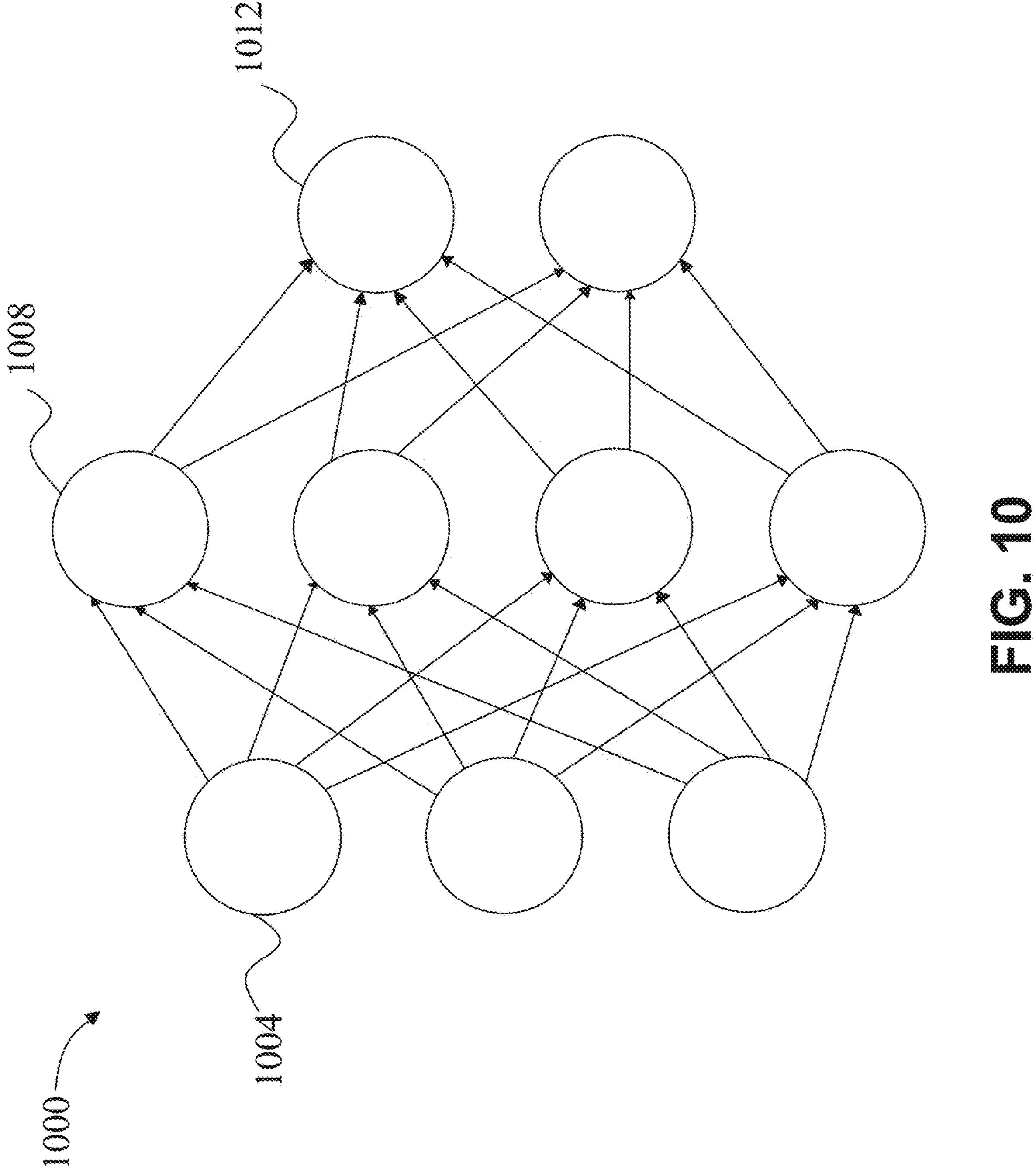
FIG. 10 is a diagram of an exemplary embodiment of a neural network.

Referring now to FIG. 10, an exemplary embodiment of neural network 1000 is illustrated. A neural network 1000 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1004, one or more intermediate layers 1008, and an output layer of nodes 1012. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 11:
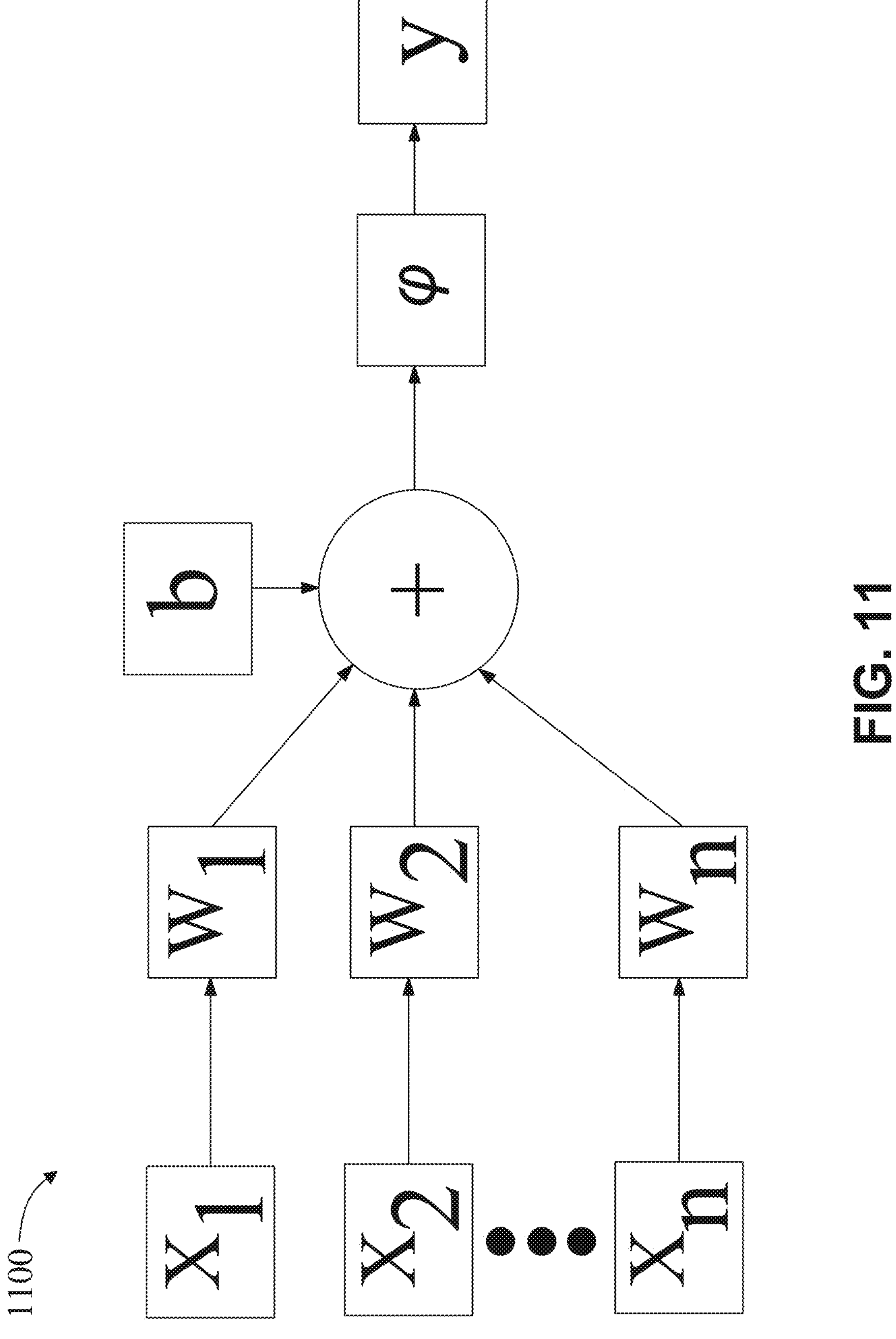
FIG. 11 is a diagram of an exemplary embodiment of a node of a neural network.

Referring now to FIG. 11, an exemplary embodiment of a node 1100 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Figure 12:
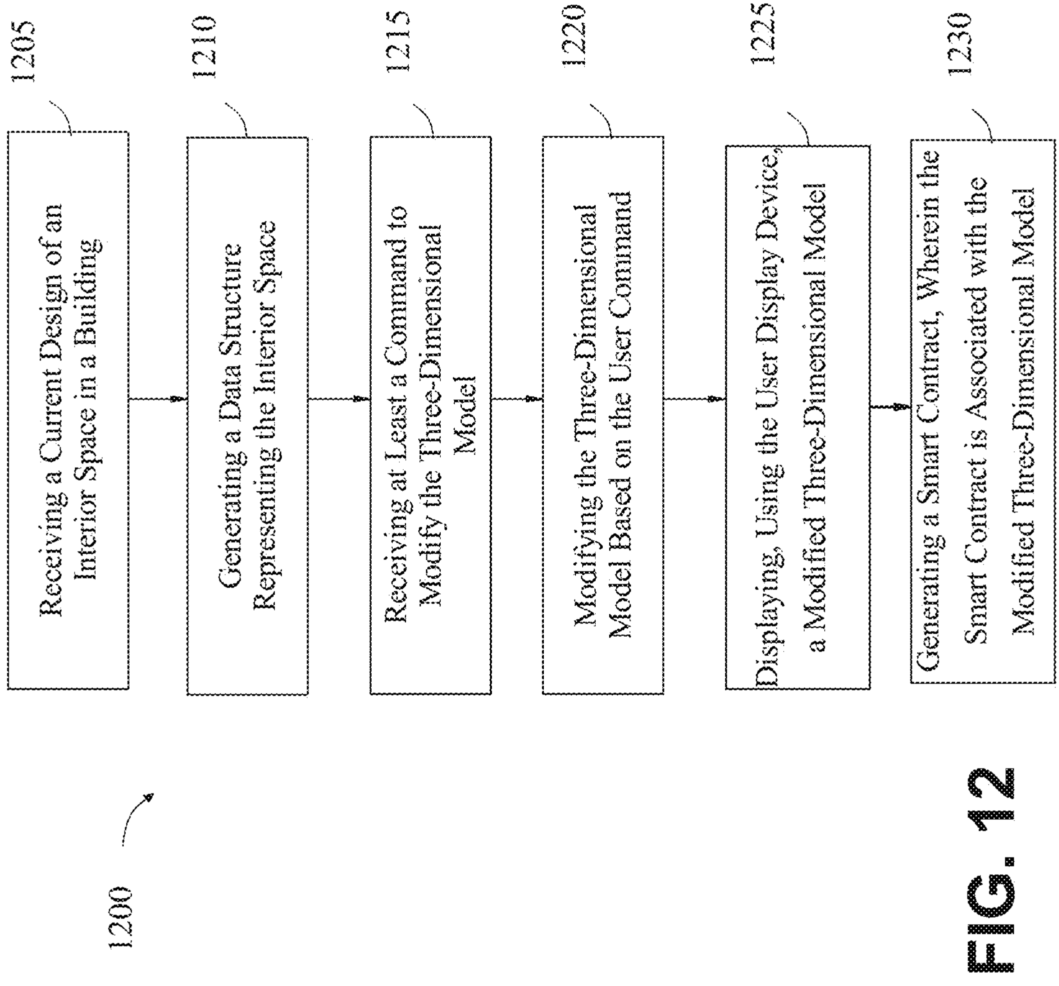
FIG. 12 is a flow diagram illustrating an exemplary embodiment of a method as described herein.

Referring now to FIG. 12, an exemplary embodiment of a method 1200 of rendering and modifying three-dimensional models for interior design is illustrated. At step 1205, a current design 108 of an interior space in a building is received; this may be accomplished, without limitation, as described above in reference to FIGS. 1-11. At step 1210, a data structure 112 representing interior space is generated. Generating the data structure 112 includes populating a plurality of attributes 116 of the data structure 112, for instance as described above in reference to FIGS. 1-11. Generating the data structure 112 includes generating a first three-dimensional model 136 of a first portion of the interior space based on the current design 108; this may be implemented as described above in reference to FIGS. 1-11. Generating first three-dimensional model 136 may include receiving a photograph of the first portion of the interior space, detecting objects within the photograph, classifying the objects to features 120, and generating the three first three-dimensional model 136 using the features 120, for instance as described above in reference to FIGS. 1-11. Generating first three-dimensional model 136 may include determining a global style attribute of the three-dimensional model, associating at least a feature 120 with the current design 108, where the at least a feature 120 further includes at least an attribute matching the global style attribute, and generating the three-dimensional model of the portion of the interior space based on the current design 108; this may be implemented, without limitation, as described above in reference to FIGS. 1-11.

Still referring to FIG. 12, first three-dimensional model 136 includes a first feature 140 having a first attribute 144 of plurality of attributes 116, for instance as described above in reference to FIGS. 1-11. A second attribute 156 of plurality of attributes 116 may be exterior to the first three-dimensional model 136. Second attribute 156 may include a global style attribute. Second attribute 156 may include an infrastructural attribute. Second attribute 156 may include a lighting attribute. In an embodiment, populating plurality of attributes 116 may include generating second attribute 156 using first attribute 144. Populating plurality of attributes 116 may include generating second attribute 156 as a function of first feature 140.

At step 1215, receiving, using modeling device 104, at least a command to modify first attribute 144, wherein receiving the at least a command includes receiving a plurality of user goals comprising an energy consumption goal specifying a level of electrical energy which should be consumed by the first feature, wherein receiving the plurality of user goals further includes displaying at a user device, a plurality of event handlers permitting user entry of degrees of importance, wherein each of the plurality of event handlers corresponds to a user goal of the plurality of user goals and receiving a plurality of degrees of importance corresponding to the plurality of user goals; this may be implemented as described above in reference to FIGS. 1-11.

At step 1220, modeling device 104 modifies first three-dimensional model 136 as a function of the at least a command to modify the first attribute 144; this may be implemented, without limitation, as described above in reference to FIGS. 1-11. At step 1225, displaying, using the user display device, a modified three-dimensional model; this may be implemented as described above in reference to FIGS. 1-11. For instance, and without limitation, where first feature 140 has at least a first attribute 144 and first three-dimensional model 136 includes a second feature 160 having at least a second attribute 156, modifying the three-dimensional model may include determining that at least a command contains a modification to the at least a first attribute 144 and modifying the at least a second attribute 156 based on the modification to the at least a first attribute 144. As another non-limiting example, where first feature 140 has at least a first attribute 144 and first three-dimensional model 136 further includes a global style attribute, modifying the first three-dimensional model 136 may include determining that at least a command contains a modification to the at least a first attribute 144, and modifying the global style attribute based on the modification to the at least a first attribute 144. At step 1230, generating a smart contract, wherein the smart contract is associated with the modified three-dimensional model; this may be implemented as described above in reference to FIGS. 1-11.

With continued reference to FIG. 12, three-dimensional modeling device 104 may calculate one or more costs of a design project to be undertaken as a function of three-dimensional model and/or interior space data structure 112. This may be done in real time and displayed to the user based on any change the user makes or that is generated automatedly. Calculation of costs may be performed as a function of any suitable combination of factors, including logistical factors, such as shipping prices, distances, or times, provided by one or more suppliers recorded in modeling device 104 as able to provide one or more items represented by features 120, material costs, labor costs, installation costs, and/or installation logistics such as without limitation the need to install electrical wiring or plumbing lines prior to installation of electrical or plumbing fixtures or the like. Calculation of costs may be divided by interior spaces or sections thereof or segregated per trade of persons who may work to modify interior spaces and/or install one or more items based on plans represented in three-dimensional model. Calculation of costs may include calculation of costs based on construction materials. Calculation of costs may include calculation of costs based on professional fees; professional fees may include "artists fees," such as without limitation fees that a designer, architect, or similar professional charges. Calculation of costs may include fees or prices for small wares. Calculation of costs may include fees or prices for fixtures, furniture, and/or equipment (FFE). Any combination of the above-described factors may be used in calculation of costs; for instance, designer fees, FFE, construction materials, and labor (union and/or non-union, for instance as filtered below), may be combined to calculate an overall cost. Cost may be updated in real time as a user makes changes to interior space data structure 112, three-dimensional model, and/or one or more features 120 or attributes; updated costs may be recalculated using any of the above factors and reflecting changes submitted by user and/or automatedly performed by system 100 and may be displayed continuously or upon any change to user.

Still referring to FIG. 12, modeling device 104 may determine, and present to user, information describing costs, logistical constraints, and/or other practical consequences of a design as represented in three-dimensional model. For instance, a given light fixture may be available immediately and/or at low cost, but may require new wiring necessitating an electrician, who may not be available immediately and/or who may charge more than a difference in cost to a fixture that can be installed with the current wiring. Persons skilled in the art, upon reviewing the entirety of this disclosure, will be aware of various ways in which practical cost and/or logistical consequences of a design as represented in three-dimensional model may be determined and/or presented to a user.

Systems and methods as described herein may provide various advantageous improvements over previously existent functionality. Multifunctionality may allow a user to see in real time what a space will look like with interior details that may impact a user's construction and/or design budget, life cycle costing, and/or operating budget. Combining design, construction budgeting, 3-D, virtual reality, and operating budgets into one seamless package may allow a user to test interior elements, flow and programming spaces with real construction costs and automatic changes to the operating proforma. Systems and methods presented herein may permit a user and/or designer to explore multiple scenarios and/or iterations that would normally be worked out over several projects or at the very least increase the cost of the project and increase delays in finishing. This may allow smarter decisions to be made more quickly and help users to avoid changing orders, throughout the project. Costs may also be calculated on module spaces vs. per trade so that adjustments to the overall cost may be made quickly when dropping or increasing square footage.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
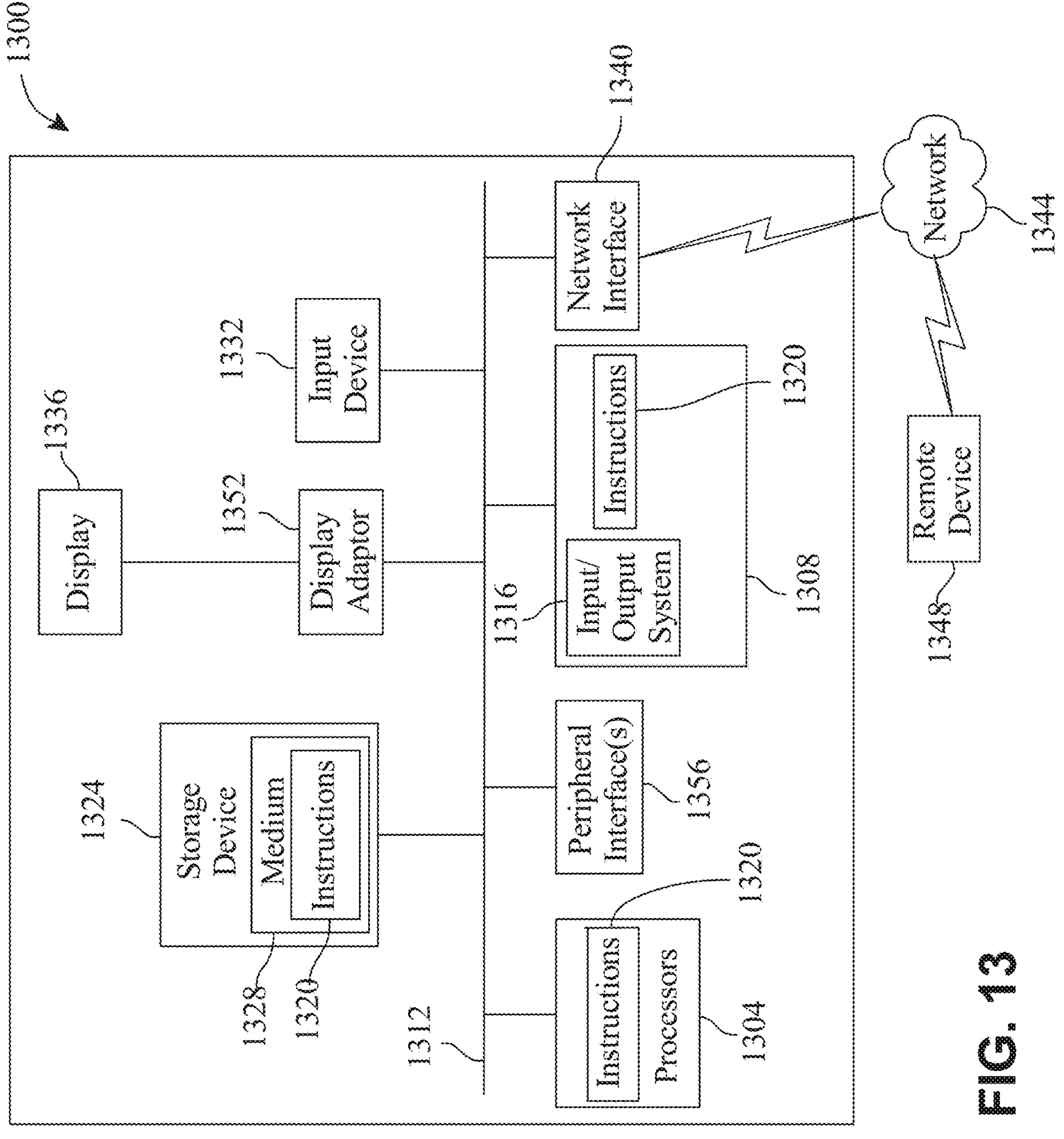
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of rendering and modifying three-dimensional models for interior design, the method comprising:

receiving, using a modeling device, a current design of an interior space;

generating, using the modeling device, a data structure representing the interior space, wherein generating the data structure further comprises generating a first three-dimensional model of a first portion of the interior space based on the current design, wherein the first three-dimensional model comprises a first feature having a first attribute, wherein generating the first three-dimensional model comprises:

receiving at least one image of the first portion of the interior space;

detecting objects within the at least one image using a machine-learning classification algorithm and matching the detected objects to feature identifiers stored in a feature database;

classifying the detected objects to a plurality of features;

determining a global style attribute of the first three-dimensional model;

associating at least one of the plurality of features with the current design, wherein the at least one associated feature includes at least one attribute matching the global style attribute; and generating the first three-dimensional model using the plurality of features;

receiving, using the modeling device, at least a command to modify the first attribute, wherein receiving the at least a command comprises:

receiving a plurality of user goals comprising an energy consumption goal specifying a level of electrical energy which should be consumed by the first feature, wherein receiving the plurality of user goals further comprises receiving a plurality of degrees of importance corresponding to the plurality of user goals;

modifying, using the modeling device, the first three-dimensional model as a function of the at least a command to modify the first attribute and the plurality of degrees of importance;

displaying, using a user display device, a modified three-dimensional model; and generating a smart contract, wherein the smart contract is associated with the modified three-dimensional model.

2. The method of claim 1, wherein displaying at a user device, a plurality of event handlers permits user entry of degrees of importance, wherein each of the plurality of event handlers corresponds to a user goal of the plurality of user goals.

3. The method of claim 1, wherein the method is further configured to execute the smart contract, wherein executing the smart contract comprises:

receiving, a digital signature from a plurality of stakeholders; and validating the digital signature from the plurality of stakeholders.

4. The method of claim 1, wherein generating the smart contract comprises generating a serial identifier, wherein the serial identifier is assigned to each instance of the smart contract.

5. The method of claim 4, wherein the serial identifier includes entries to be verified using an immutable sequential listing.

6. The method of claim 3, wherein the method further utilizes a cryptographic system wherein the cryptographic system validates the digital signature of the plurality of stakeholders.

7. The method of claim 1, wherein the method comprises a machine learning model, wherein the machine learning model is trained using a plurality of executed smart contracts.

8. The method of claim 1, wherein the first feature is associated with a financial variable, wherein the financial variable corresponds to a spatial datum.

9. The method of claim 8, further comprising calculating a financial variable, wherein calculating the financial variable comprises:

training a locality machine-learning model using locality training data, wherein the locality training data comprises first features and locality data correlated to financial variables; and generating the financial variable using the trained locality machine-learning model.

10. The method of claim 8, wherein the financial variable comprises a plurality of cost components.

11. A system for rendering and modifying three-dimensional models for interior design, the system comprising:

at least a computing device, wherein the at least a computing device comprises:

a memory; and at least a processor communicatively connected to the memory, wherein the memory contains instructions configuring the at least a processor to:

receive a current design of an interior space;

generate a data structure representing the interior space, wherein generating the data structure further comprises generating a first three-dimensional model of a first portion of the interior space based on the current design, wherein the first three-dimensional model comprises a first feature having a first attribute, wherein generating the first three-dimensional model comprises:

receiving at least one image of the first portion of the interior space;

detecting objects within the at least one image using a machine-learning classification algorithm and matching the detected objects to feature identifiers stored in a feature database;

classifying the detected objects to a plurality of features;

determining a global style attribute of the first three-dimensional model;

associating at least one of the plurality of features with the current design, wherein the at least one associated feature includes at least one attribute matching the global style attribute; and generating the first three-dimensional model using the plurality of features;

receive, using the at least a computing device, at least a command to modify the first attribute, wherein receiving the at least a command comprises:

receiving a plurality of user goals comprising an energy consumption goal specifying a level of electrical energy which should be consumed by the first feature, wherein receiving the plurality of user goals further comprises receiving a plurality of degrees of importance corresponding to the plurality of user goals;

modify, using the modeling device, the first three-dimensional model as a function of the at least a command to modify the first attribute and the plurality of degrees of importance;

display, using a user display device, a modified three-dimensional model; and generate a smart contract, wherein the smart contract is associated with the modified three-dimensional model.

12. The system of claim 11, wherein displaying at a user device, a plurality of event handlers permits user entry of degrees of importance, wherein each of the plurality of event handlers corresponds to a user goal of the plurality of user goals.

13. The system of claim 11, wherein the system is further configured to execute the smart contract, wherein executing the smart contract comprises:

receiving, a digital signature from a plurality of stakeholders; and validating the digital signature from the plurality of stakeholders.

14. The system of claim 13, wherein the system further utilizes a cryptographic system wherein the cryptographic system validates the digital signature of the plurality of stakeholders.

15. The system of claim 11, wherein generating the smart contract comprises generating a serial identifier, wherein the serial identifier is assigned to each instance of the smart contract.

16. The system of claim 15, wherein the serial identifier includes entries to be verified using an immutable sequential listing.

17. The system of claim 11, wherein the system comprises a machine learning model, wherein the machine learning model is trained using a plurality of executed smart contracts.

18. The system of claim 11, wherein the first feature is associated with a financial variable, wherein the financial variable corresponds to a spatial datum.

19. The system of claim 18, further comprising calculating a financial variable, wherein calculating the financial variable comprises:

training a locality machine-learning model using locality training data, wherein the locality training data comprises first features and locality data correlated to financial variables; and generating the financial variable using the trained locality machine-learning model.

20. The system of claim 18, wherein the financial variable comprises a plurality of cost components.

* * * * *